(12) United States Patent
Kelani et al.

(10) Patent No.: US 12,367,073 B2
(45) Date of Patent: Jul. 22, 2025

(54) MANAGEMENT OF A SCALABLE POOL OF WORKSTATION INSTANCES

(71) Applicant: NETFLIX, INC., Los Gatos, CA (US)

(72) Inventors: Kevin Ibraheem Kelani, Inglewood, CA (US); Airan Landau, Saratoga, CA (US); Kevin L. Cureton, San Francisco, CA (US); Marian Montagnino, Studio City, CA (US); Michelle Lynne Brenner, Los Angeles, CA (US); Thomas A. Cellucci, Scotts Valley, CA (US); Anna J. Brosnahan, Sunnyvale, CA (US); William Andrew Thurston, Pleasanton, CA (US)

(73) Assignee: NETFLIX, INC., Los Gatos, CA (US)

( * ) Notice: Subject to any disclaimer, the term of this patent is extended or adjusted under 35 U.S.C. 154(b) by 1030 days.

(21) Appl. No.: 17/194,097

(22) Filed: Mar. 5, 2021

(65) Prior Publication Data
US 2022/0283867 A1    Sep. 8, 2022

(51) Int. Cl.
   *G06F 9/50*         (2006.01)
(52) U.S. Cl.
   CPC .... *G06F 9/5027* (2013.01); *G06F 2209/5011* (2013.01)
(58) Field of Classification Search
   CPC ........... G06F 9/5027; G06F 2209/5011; G06F 9/5077
   See application file for complete search history.

(56) References Cited

U.S. PATENT DOCUMENTS

| | | | |
|---|---|---|---|
| 8,065,676 B1* | 11/2011 | Sahai | G06F 9/5077 718/1 |
| 9,507,612 B1* | 11/2016 | Henry | G06F 9/5027 |
| 9,756,050 B1* | 9/2017 | Brandwine | H04L 47/70 |
| 10,002,026 B1* | 6/2018 | Wagner | G06F 9/45558 |
| 10,042,660 B2 | 8/2018 | Wagner et al. | |
| 10,042,676 B1* | 8/2018 | Wei | G06F 9/5077 |
| 10,241,812 B2* | 3/2019 | Calder | G06F 9/45558 |
| 2008/0201711 A1* | 8/2008 | Amir Husain | H04L 65/1069 718/1 |
| 2010/0293204 A1* | 11/2010 | Baker | H04L 41/0895 707/812 |
| 2011/0029970 A1* | 2/2011 | Arasaratnam | G06F 9/45558 718/1 |
| 2012/0246740 A1* | 9/2012 | Brooker | G06F 21/629 726/28 |
| 2013/0179881 A1* | 7/2013 | Calder | G06F 9/5072 718/1 |

(Continued)

OTHER PUBLICATIONS

1 International Search Report for Application No. PCT/US2022/018332 dated May 12, 2022.

*Primary Examiner* — Benjamin C Wu
(74) *Attorney, Agent, or Firm* — Artegis Law Group, LLP

(57) ABSTRACT

Various embodiments of the present application set forth a computer-implemented method comprising receiving, from a client, a request for a workstation instance having a first configuration, in response to the request, generating a first workstation pool associated with the first configuration, wherein the first workstation pool includes at least two unassigned workstation instances having the first configuration, and assigning at least a first workstation instance included in the at least two unassigned workstation instances to the client.

19 Claims, 10 Drawing Sheets

(56) References Cited

U.S. PATENT DOCUMENTS

| | | | |
|---|---|---|---|
| 2015/0378765 A1* | 12/2015 | Singh | G06F 3/04847 |
| | | | 718/1 |
| 2016/0191432 A1* | 6/2016 | Panchapakesan | H04L 51/42 |
| | | | 709/206 |
| 2017/0200102 A1* | 7/2017 | Kapasi | H04L 67/10 |
| 2018/0129524 A1* | 5/2018 | Bryant | G06F 11/3006 |
| 2019/0146850 A1* | 5/2019 | Quinn | H04L 41/082 |
| | | | 709/226 |
| 2019/0278620 A1* | 9/2019 | Korbar | G06F 9/44505 |
| 2020/0034206 A1* | 1/2020 | Dimitrov | G06F 9/5077 |
| 2021/0359914 A1* | 11/2021 | Savov | G06F 9/45558 |

* cited by examiner

MANAGEMENT OF A SCALABLE POOL OF WORKSTATION INSTANCES

BACKGROUND

Field

Embodiments of the present disclosure relate generally to distributed computing systems and, more specifically, to management of a scalable pool of workstation instances.

Description of the Related Art

Distributed computing systems include many different hardware and software components that operate to provide a variety of services to clients of the distributed computing systems. For example, one distributed computing system executing video production services could enable various endpoint devices to connect to remote virtual machines, such as remote workstations. The remote workstation can be used to execute programs using various networked processing and memory resources and access data stored in remote data stores.

In various circumstances, an endpoint device may need to access a remote workstation that has particular technical capabilities in order to complete certain types of tasks. For example, the endpoint may need to perform an encoding task on a video content item and therefore, need to connect to a remote workstation that has the requisite technical capabilities needed to execute an encoding application. However, remote workstations possessing the technical capabilities to perform such tasks consume large amounts of memory and processing resources of the devices hosting the remote workstation.

In order to manage resource consumption, conventional techniques often limit the processing and memory resources consumed by remote workstations by only maintaining remote resources as-demanded. For example, a system employing conventional techniques may only provision new remote workstations in response to receiving specific requests to acquire remote workstations.

One drawback with such approaches to managing resource consumption associated with remote workstations is that configuring a new remote workstation takes a great amount of time. For example, the remote service may initially preserve resources by waiting to receive a request for a specific configuration before provisioning and configuring a new remote workstation. The remote service may respond to a received request to configure a new remote workstation by, among other things, installing operating systems, installing drivers for specific applications and protocols, installing packages of applications, and accessing applicable data from other locations. In such cases, a given endpoint device must wait for long time periods after initially requesting a particular configuration for a remote workstation before the endpoint device can acquire a requested remote workstation possessing the requested configuration. Such techniques slow the responsiveness of the distributed computing system, as the remote service that provides the remote workstation performs time-intensive techniques to generate and configure a new remote workstation.

As the foregoing illustrates, more effective techniques for managing remote workstations are needed in the art.

SUMMARY

Various embodiments of the present application set forth a computer-implemented method comprising receiving, from a client, a request for a workstation instance having a first configuration, in response to the request, generating a first workstation pool associated with the first configuration, wherein the first workstation pool includes at least two unassigned workstation instances having the first configuration, and assigning at least a first workstation instance included in the at least two unassigned workstation instances to the client.

Other embodiments include, without limitation, a computer system that performs one or more aspects of the disclosed techniques, as well as one or more non-transitory computer-readable storage media including instructions for performing one or more aspects of the disclosed techniques.

The workstation pool manager efficiently controls the availability of workstation instances that endpoint devices remotely access. In particular, by causing multiple workstation instances to be available for endpoint devices to acquire and access, endpoint devices may not need to wait extended time periods for new workstation instances to be generated and configured, significantly reducing delays associated with connecting to remote workstations and performing tasks.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
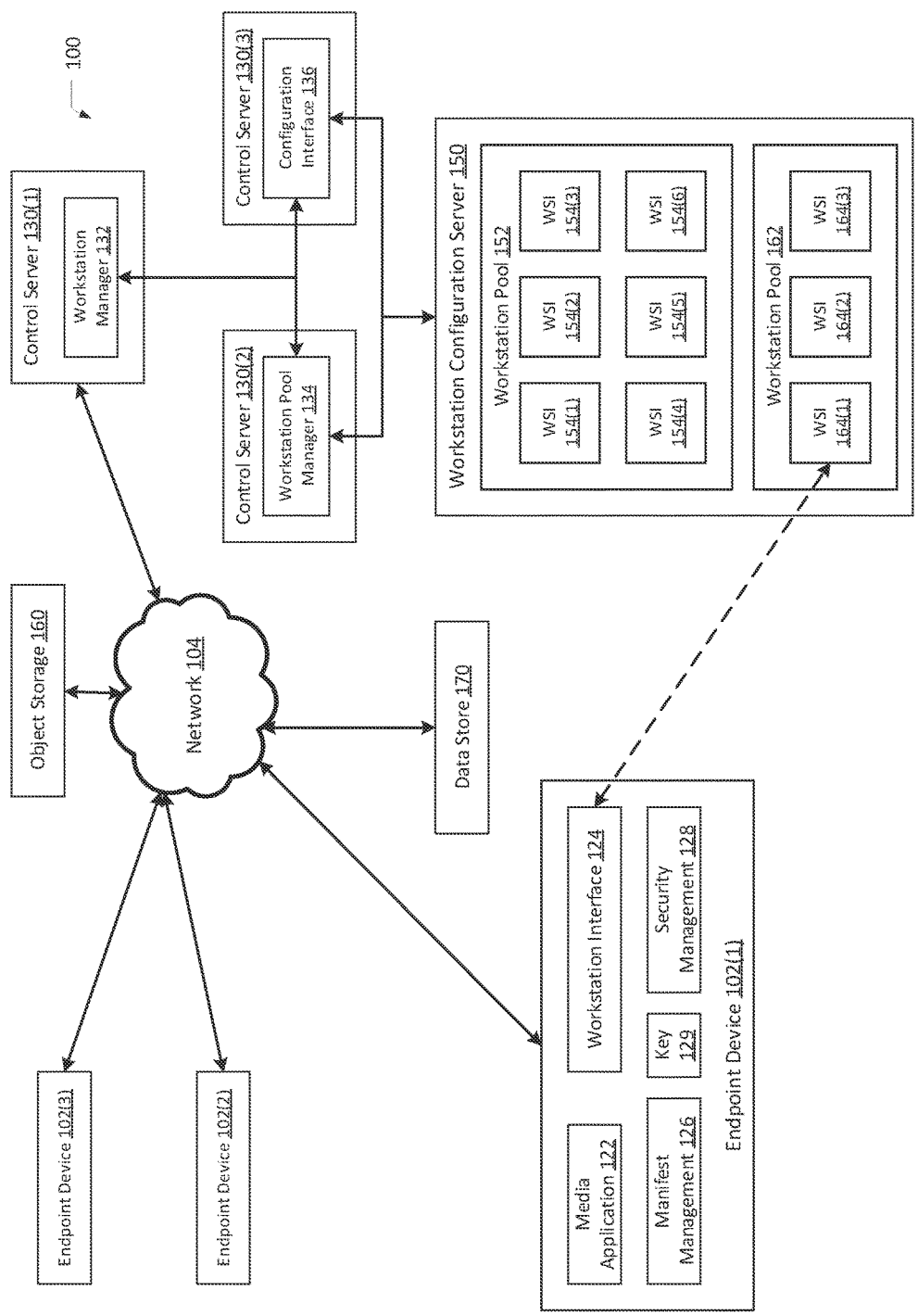
FIG. 1 illustrates a network infrastructure configured to implement one or more aspects of the present disclosure.

In the following description, numerous specific details are set forth to provide a more thorough understanding of the embodiments of the present disclosure. However, it will be apparent to one of skill in the art that the embodiments of the present disclosure may be practiced without one or more of these specific details.

Overview

Distributed computing systems include many different hardware and software components that operate to provide a variety of services to clients of the distributed computer systems. A distributed computing system executing video production services could provide users with the ability to create, access, and modify various content items through use of various remote services. For example, a user could operate an endpoint device in order to access a video, or specific scene of a video, and edit the video for distribution. In another example, one or more users may encode a video in order to prepare the video for subsequent streaming for playback. Under various circumstances, a user performs tasks associated with video production services by accessing a virtual machine that acts as a virtual workstation. The virtual workstation accesses content items that are accessible to the user and runs the applicable software necessary to perform the task. Therefore, accessing the virtual workstation and installing the applicable software on the virtual workstation are important components of distributed video production.

Prior art techniques required that a user initiate the creation of a new instance of a virtual workstation each time the user logged in to the distributed computing system. For example, a conventional distributed computing system that included virtual workstations would respond to requests for virtual workstations as the requests were received, configure the virtual workstations, and install the applicable software packages and drivers upon creation. However, such techniques greatly increased the time latency associated with a given user accessing a requested virtual workstation, due to the time required for the remote service to create and install applications on the requested virtual workstation. Such time latency in responding to a workstation request consequently leads to a significant increase in the time required to complete a production workflow for a given video.

In contrast, the disclosed network infrastructure and associated disclosed techniques enable a video production system to manage a scalable pool of available virtual machines. A workstation pool manager receives a request for a specific type of virtual workstation with a specific configuration, such as a virtual workstation operating on a specific operating system with a package of applications installed. The workstation pool manager responds to the request by determining whether the remote service has an existing pool of virtual workstations that match the configuration requested. When the workstation pool manager determines that no existing pool of virtual workstations have the requested configuration, the workstation pool manager causes the remote service to generate a new pool of virtual workstations that have the requested configuration. In particular, the workstation pool manager causes the remote service to generate the new workstation pool by causing the remote service to generate a group of virtual workstations that each have the requested configuration, where at least two of the virtual workstations in the group remain idle and unassigned to a particular user. The workstation pool manager may then respond to subsequent requests for the same configuration by identifying the workstation pool and identifying the idle virtual workstation, greatly increasing the speed in responding to the subsequent request. The workstation pool manager may also cause the remote service to generate idle virtual workstations in anticipation of receiving requests for a specific configuration.

For example, a workstation pool manager could ensure that the remote service always maintains at least two idle and available virtual workstations that have given configuration. Consequently, the workstation pool manager could respond to requests for a virtual workstation having the given configuration by identifying the idle virtual workstation in lieu of requesting that a new virtual workstation be generated and configured, responding to the request with much lower latency. In another example, the workstation pool manager could determine a likely set of requests are to occur at a scheduled time, such as at the beginning of a work shift for the region. The workstation pool manager could then cause the remote service to generate a pool of virtual workstations in anticipation of expected requests by the scheduled time. In such cases, the workstation pool manager can similarly respond to requests by identifying an idle and available virtual workstation from the existing workstation pool.

The workstation pool manager thus addresses various limitations of conventional distributed computer networks and techniques associated with virtual machines and remote services. More specifically, conventional virtual workstation management techniques would require a remote service to generate every instance of a virtual workstation on-demand, increasing latency in responding to requests and straining processing and network resources. Alternatively, other conventional virtual machine management techniques would require that the remote services create and maintain idle virtual workstations for every possible configuration that could be requested. Such techniques would require the remote service to maintain a large number of idle virtual workstations, even for infrequently-requested configurations. As a result, the remote service maintained idle workstation instances that would remain inactive for long periods, wasting storage and processing resources. By contrast, a distributed network that uses the disclosed workstation pool management techniques efficiently manages the size and composition of virtual workstations that are provided by a remote service in order to effectively manage the quantity of available virtual workstations and respond to requests for virtual workstations with lower time latency. An endpoint device operating within the distributed network using the disclosed techniques can therefore acquire and access a requested virtual workstation more easily and with greater control.

Management of a Scalable Pool of Workstation Instances

FIG. 1 illustrates a network infrastructure configured to implement one or more aspects of the present disclosure. As shown, the distributed video production system 100 that is a portion of the network infrastructure includes, without limitation, endpoint devices 102 (e.g., 102(1), 102(2), 102(3), etc.), a network 104, control servers 130 (e.g., 130(1), 130(2), 130(3), etc.), a workstation manager 132, a workstation pool manager 134, a configuration interface 136, a workstation configuration server 150, object storage 160, and a data store 170. The endpoint device 102 includes a media application 122, a workstation interface 124, a manifest management module 126, a security management module 128, and a security key 129. The workstation configuration server 150 includes workstation pools 152, 162, and workstation instances 154, 164 (e.g., 154(1), 154(2), 164(1), 164(2), etc.).

For explanatory purposes, multiple instances of like objects are denoted with reference numbers identifying the object and additional numbers identifying the instance where needed. Further, the distributed video production system 100 includes multiple instances of devices, even when not shown. For example, the distributed video production system 100 could include multiple media applications 122 (e.g., 122(1), 122(2), etc.), workstation configuration servers 150 (e.g., 150(1), 150(2), etc.) and/or data stores 170 (e.g., 170(1), 170(2), etc.) and still be within the scope of the disclosed embodiments.

In operation, the workstation interface 124 included in the endpoint device 102(1)) causes the endpoint device 102(1) to acquire a specific workstation instance (WSI) 164(1), enabling a user of the endpoint device 102(1) to complete a set of tasks using one or more applications installed at the WSI 164(1). In particular, the endpoint device 102(1) transmits a workstation request message that specifies a set of one or more configuration settings ("configuration set") that the acquired workstation instance is to possess. A workstation pool manager 134 included in a control server 130(2) responds to the workstation request message by analyzing the contents of a workstation configuration server 150 in order to determine, based on the existing workstation pools 152, 162, whether an available workstation instance within an existing pool (e.g., WSI 154(1), WSI 164(1)) has been configured with the configuration settings that were specified in the configuration set. For example, the workstation pool manager 134 could maintain a list of existing workstation pools 152, 162, and configuration settings. In various embodiments, each workstation pool 152, 162 may maintain multiple workstation instances 154, 164 having the same configuration settings within a given workstation pool, and each workstation pool 152, 162 may be associated with a different configuration.

When the workstation pool manager 134 determines that the requested configuration set matches the configuration settings of an existing workstation pool 152, the workstation pool manager 134 reports the identified workstation pool 152 and/or an idle workstation instance in the workstation pool 152 (e.g., WSI 154(4)) to the workstation manager 132. Based on the identification to the workstation manager 132, the workstation manager 132 assigns the identified WSI 154(4) to the endpoint device 102(1). Otherwise, the workstation pool manager 134 causes the workstation configuration server 150 to generate a new workstation pool 162 based on the configuration set, where the new workstation pool 162 includes multiple workstation instances that are configured with the configuration settings specified in the configuration set. The workstation manager 132 then assigns a newly-created workstation instance (e.g., WSI 164(1)) from the new workstation pool 162 to the endpoint device 102(1).

In various embodiments, the workstation pool manager 134 may manage the scale of different workstation pools 152, 162 in order to efficiently manage the composition of workstation instances 154, 164 within the workstation configuration server 150. In some embodiments, the workstation pool manager 134 may anticipate demand for one or more workstation instances 154, 164 from the respective workstation pools 152, 162 by causing the workstation configuration server 150 to maintain multiple idle workstation instances 154, 164 that the workstation pool manager 134 can quickly identify. In such cases, the workstation pool manager 134 processes workstation data associated with the workstation configuration server 150 (e.g., historical data including workstation logs and workstation request messages, connections to workstation instances, changes in the state of specific workstation instances 154, 164, etc.) in order to identify specific workstation pools 152, 162 that are likely to be requested by one or more endpoint devices 102 in a subsequent time period. Upon identifying workstation instances 154, 164 that are likely or unlikely to be requested, the workstation pool manager 134 may cause the workstation configuration server 150 to generate, scale, and/or decommission specific workstation pools 152, 162 in order to efficiently manage the available memory and processing resources of the workstation configuration server 150. Such scaling techniques performed by the workstation pool manager 134 ensures that multiple workstation instances (e.g., WSIs 154(1)-154(6)) are available to be acquired by a requesting endpoint device 102 before the workstation pool manager 134 receives a workstation request message, reducing the time associated with generating and configuring a new workstation instance 154.

An endpoint device 102 (e.g., 102(1), 102(2), 102(3), etc.) includes one or more processors and memory subsystems. The processor may run user processes (e.g., the media application 122, the workstation interface 124, the manifest management module 126, the security management module 128, etc.) that enable the user to complete various tasks. The endpoint device 102 is connected to the network 104 via one or more communications channels that transport large files, objects, and/or other messages between components. For example, the media application 122 could communicate with object storage 160 in order to access objects stored in the object storage 160 via streaming and/or download. In some embodiments, one or more user processes may be installed and run by a corresponding workstation instance (e.g., workstation instance 164(1) may run a copy of the manifest management module 126 in order to retrieve assets from object storage 160 and/or data store 170).

The media application(s) 122 (e.g., 122(1), 122(2), etc.) are applications that access various content items during execution of various processes associated with the accessed content item. For example, the media application 122 could be a visual effects application that accesses a local content item, or a content item stored in the object storage 160 and/or the data store 170 in order to execute a graphical rendering and enable a user to complete a task in a video production workflow. In various embodiments, the media application 122 could be one of several types of software products, such as coding environments, encoding environments, graphics design applications, word processing applications, productivity and communication applications, entertainment applications (e.g., content playback applications, games, etc.), and so forth. In various embodiments, the media application 122 may include various tools and functions that enable a user to perform specific tasks within the media application 122. For example, the media application 122 could be an instance of a three-dimensional (3D) design application that is implemented by the endpoint device 102, where the 3D design application provides various graphical design and rendering tools to generate and render 3D design models.

In some embodiments, one or more applications, assets, and/or modules, such as one or more media applications 122, the manifest management module 126, the security management module 128, and/or the key 129, may be installed in a workstation instance 154, 164. In such cases, the endpoint device 102 may access the applicable user process via the applicable workstation instance 154, 164. For example, the endpoint device 102 could access the media application 122 that the workstation instance 154, 164 is executing via the workstation interface 124. In order to effectively execute a given media application 122, the workstation instance 154, 164 may be configured with specific operating characteristics that enable the workstation instance 154, 164 to effectively execute portions of the media application 122 and present the information to the user. Using the above example, a given workstation instance 164(1) may be configured to access a connected graphical processing unit (GPU) in order to efficiently render 3D design models in the 3D design application executing on the workstation instance 164(1).

A workstation interface 124 may be a user interface, such as a graphical user interface (GUI) that enables a user to interact with a remote workstation instance 154, 164 via the endpoint device 102. For example, the workstation interface 124 may employ a window-and-object metaphor that provides a mechanism for user interaction with the workstation interface 154, 164. In various embodiments, the workstation interface 124 enables communication and interaction with the operating system of the workstation instance 154, 164.

In various embodiments, the workstation interface 124 may present various files in a file system accessible by the workstation instance 154, 164, including one or more objects mounted as one or more files. Additionally or alternatively, the workstation interface 124 may present menus that enable the user to generate a configuration set to request when requesting a workstation instance 154, 164. For example, the workstation interface 124 may present a selection screen (not shown) that lists configuration settings for a workstation instance 154, 164. The workstation interface 124 may then receive the user inputs selecting values for the respective configuration settings and may generate a workstation request message that includes the user-selected values as configuration settings specified by a configuration set.

The manifest management module 126 processes and/or writes to a manifest that associates a user to a group of accessible content items within the network infrastructure. In various embodiments, one or more devices within the video production system 100 may store a manifest for a user that specifies the contents of a namespace for a given user. The user namespace may include the objects, nodes, files, and so forth, that are accessible by the user. In such cases, the manifest may also specify the object storage 160 and/or data stores 170 that store the identified objects, nodes, and files. For example, the manifest could list files and objects associated with a specific content item and include a unique node identifier (UN ID) and a relative path for the files and objects within the user namespace. The manifest is continually updated to reflect the content items to which a user is granted access. In some embodiments, the manifest also includes security information and/or identification information, such as the certification path for a security key 129 that is associated with the user. In some embodiments, a common namespace may be associated with a group of users, such as a common workspace. For such cases, the security information may include security keys that are common to the group.

In various embodiments, the endpoint device 102 executes the manifest management module 126 to retrieve a manifest that is associated with the user during startup in order to configure a user namespace. In various embodiments, the user namespace is to be included in an acquired workstation instance (e.g., WSI 164(1)). In various embodiments, the manifest management module 126 may process the contents of the manifest in order to configure the user namespace, including the user namespace within the workstation instance 164(1). In some embodiments, the manifest management module 126 may periodically process the manifest and/or be explicitly instructed to affect one or more changes to determine whether the contents of the manifest has changed. In such instances, the endpoint device 102 may execute the manifest management module 126 to dynamically update the user namespace to reflect the changes made in the manifest.

In various embodiments, when the workstation interface 124 and/or the media application 122 requests a content item, the manifest management module 126 may cause the endpoint device 102 to send a request to the specific data store 170 that is storing the data and/or metadata associated with the content item. The data store 170 may then locate the specific data and metadata associated with the content item and transfer the respective data or metadata to the workstation instance 164(1) and/or the endpoint device 102. When the user makes updates to the content item, the workstation instance 164(1) or the endpoint device 102 may send the updated data and/or updated metadata back to the data store 170.

A security management module 128 enables the secure transfer of content items between devices. In some embodiments, the security management module 128 may respond to verification requests and/or transfer requests by providing security credentials, such as the security key 129 that is associated with the user. Additionally or alternatively, the security management module 128 may provide authorization tokens and/or other security credentials or identity information to requesting devices. For example, the security management module 128 could include security key 129 in request messages to retrieve content items from object storage 160 and/or the data store 170. In such cases, object storage 160 and/or the data store 170 could verify the security key 129 before transferring the content item. In some embodiments, the security management module 128 may sign one or more messages using the security key 129 in order to send secure messages via the network 104. In some embodiments, the security management module 128 may, upon receipt of a token, distribute the token and/or the key 129 to one or more other devices (e.g., object storage 160, the data store 170, the workstation configuration server 150) in order to encrypt the data being transferred and enable secure transfer of the data.

In various embodiments, the distributed video production system 100 may include one or more control servers 130 (e.g., 130(1), 130(2), 130(3)) that determine the availability and location of various resources within the video production system 100. For example, one or more control servers 130 may execute the workstation manager 132, the workstation pool manager 134, and/or the configuration interface 136 in order to determine the state of workstation pools 152, 162 and/or the state of specific workstation instances 154, 164. Additionally or alternatively, the control servers 130 may track and manage various files stored within the distributed video production system 100.

In various embodiments, the video production system 100 may include a single control server 130. In such circumstances, each of the workstation manager 132, the workstation pool manager 134, and the configuration interface 136 may be stored as separate modules within the single control server 130. Alternatively, the video production system may include multiple control servers 130 that are operated by different entities or may be included in different networks. For example, one party may operate the control servers 130(1), 130(2), while a different party may operate the control server 130(3) and the workstation configuration server 150. In various embodiments, the control servers 130 may communicate via the network 104 when operating the workstation manager 132, the workstation pool manager 134, and/or the configuration interface 136.

A workstation manager 132 manages the configuration of workstation instances 154, 164, as well as integrates various protocols, application programming interfaces (APIs), clients, and security/authentication protocols associated with a user acquiring a workstation instance 154, 164. In various embodiments, the workstation manager 132 may manage a session of interactions between the endpoint device 102 and an assigned workstation instance 154, 164.

Additionally or alternatively, the workstation manager 132 may control the workstation lifecycle of a given workstation instance 154, 164, may determine the state of the given workstation instance 154, 164 and may change the state of the given workstation instance 154, 164 on behalf of the user. For example, the workstation manager 132 could change the state of a workstation instance 164(2) included in the workstation pool 162 from an "idle" state (available and unassigned) to an "assigned" state (acquired by the endpoint device 102). The workstation manager 132 may subsequently change the state of the WSI 164(2) to a "waiting for login" state (all applicable media applications 122 are successfully installed; waiting for the user to be authenticated). The workstation manager 132 may control the various other states of the workstation instance 164(2) in order to reflect whether the workstation instance 164(2) is actively involved in a workstation session, is marked for deletion, and so forth.

In various embodiments, the workstation interface 124 may communicate with the workstation manager 132 in order to connect to a specific workstation instance. In such cases, the workstation manager 132 may identify a specific workstation instance (e.g., WSI 164(2)) for the endpoint device 102 to acquire and may authenticate the user in order to establish a connection between the workstation interface 124 and the acquired workstation instance 164(2) and allow the user to initiate a workstation session where the workstation instance 164(2) provides data to the endpoint device 102(1) (e.g., a video streaming session).

Additionally or alternatively, the workstation manager 132 may generate workstation data, such as workstation records that tracks the workstation state for each workstation instance 154, 164, and workstation task records, which are log data that tracks the operations performed on a given workstation instance 154, 164. In various embodiments, the workstation pool manager 134 may process and analyze the workstation data generated by the workstation manager 132 in order to identify available workstation instances 154, 164 and/or scale a workstation pool 152, 162 in anticipation of workstation request messages from the endpoint devices 102.

The workstation pool manager 134 manages the contents of the workstation configuration server 150 by managing the quantity of workstation instances 154, 164. In various embodiments, the workstation pool manager 134 manages multiple instances having the same configuration by grouping the instances together into a common workstation pool 152, 162. Each workstation pool 152 maintains a set of identical workstation instances 154(1)-154(6) that share a common configuration. In various embodiments, the workstation pool manager 134 may receive a workstation request message that is transmitted from the endpoint device 102, where the workstation request message includes a configuration set. In such cases, the workstation pool manager 134 may respond by identifying a workstation pool with configuration settings matching the configuration set and an idle workstation instance (e.g., all of the applicable media applications 122 have been installed and the instance is unassigned) within the identifier workstation pool, and report the idle workstation instance to the workstation manager 132, which may assign the idle workstation instance to the endpoint device 102.

In various embodiments, the workstation pool manager 134 may maintain one or more lists of existing workstation pools. The list of existing workstation pools may list each of the existing workstation pools 152, 162, as well as the configuration settings for the workstation instances 154, 164 included in each respective workstation pool 152, 162. In some embodiments, a given workstation pool 152, 162 may be listed with a workstation pool identifier (ID) that uniquely identifies the workstation pool 152, 162. In some embodiments, the workstation pool ID may be derived from the configuration settings associated with the pool. In such instances, the workstation pool manager 134 may identify a workstation pool 152 associated with configuration settings matching the values of a given configuration set by scanning the workstation pool IDs included in the list of existing workstation pools.

In various embodiments, the workstation pool manager 134 may manage the workstation configuration server 150 by managing the workstation pools 152, 162, such as by causing a given workstation pool 152 to be created, specific workstation instances 154 within the workstation pool 152 to be created or decommissioned, and/or decommissioning the entire workstation pool 152. In various embodiments, the workstation pool manager 134 may manage a given workstation pool 152 in anticipation of, instead of in response to, receiving workstation request messages. In such cases, the workstation pool manager 134 may reduce delays in assigning workstation instances 154 to one or more endpoint devices 102 by causing the workstation configuration server 150 to create workstation instances 154, and pre-install packages of media applications 122, later responding to a received workstation request message by identifying an existing idle workstation instance 154 in lieu of requesting that the workstation configuration server 150 generate a new workstation instance.

The configuration interface 136 for a workstation configuration server 150 may be a component of the workstation configuration server 150, or a module on a separate device, that provides an interface for other devices, such as the workstation pool manager 134, the workstation manager 132, the endpoint devices 102, etc., to communicate with the workstation configuration server 150. In various embodiments, the configuration interface 136 may include components like a task queue and/or queue processor in order to manage task pipelines associated with the architecture and operation of the workstation configuration server 150. In some embodiments, one or more devices in the video production system 100 may communicate directly with the workstation configuration server 150 in lieu of communicating with the configuration interface 136.

The workstation configuration server 150 includes memory, processing, and storage to operate groups of workstation instances 154, 164. In various embodiments, the workstation configuration server 150 may separately operate each of the workstation instances 154, 164 as separate compute instances that execute processes using connected processing and/or memory resources. In various embodiments, the workstation configuration server 150 may configure a workstation instance in response to a command from the workstation manager 132, the workstation pool manager 134, and/or the configuration interface 136. Based on the configuration actions performed on a given workstation instance, the workstation configuration server 150 may add the workstation instance to a specific workstation pool, where each instance in the workstation pool shares an identical configuration. In various embodiments, the workstation configuration server 150 may register each created workstation instance 154, 164 with the workstation pool manager 134 and may report the workstation state, including whether a given workstation is assigned, idle, or inactive, to the workstation manager 132 and/or the workstation pool manager 134.

In various embodiments, the object storage 160 may include, for example, one or more devices, such as one or more web servers, that store data from a plurality of sources. In various embodiments, the object storage 160 may be an online storage service (e.g., Amazon® Simple Storage Service (S3), Google® Cloud Storage, etc.) in which a catalog of thousands or millions of files and/or objects is stored and/or accessed. In some embodiments, the object storage 160 also may provide computing and/or other processing services. In various embodiments, the object storage 160 may permanently store one or more content items associated with an audiovisual program. For example, an audiovisual program may be encoded as different versions, with each version of the audiovisual program being stored as a separate object.

In various embodiments, a user of the endpoint device 102 may be authorized to access a specific set of content items. The set of content items that are accessible to the user may be a subset of content items stored within the object storage 160. For example, a system administrator or service within network infrastructure (e.g., a workflow manager) could grant the user permission to access a subset of the content items storage in the object storage 160. In such instances, the workstation interface 124 and/or assigned workstation instance 164(1) could identify the subset of content items (as identified in a manifest for the user) in order to further configure the assigned workspace instance 164(1) that includes the subset of content items.

In some embodiments, the set of content items may be associated with each other through hierarchical permissions. For example, a given content item (e.g., an animated chair) may have a set of linked component content items (e.g., wire frame, textures, sound effects, etc.). In such cases, granting the user access to the given content item may also, through the hierarchical permissions, grant access to one or more of the component content items. The manifest for the user may be updated to include the hierarchy of component items to which the user has access.

A data store 170 stores one or more files associated with the video production system 100. In various embodiments, the data store 170 may be an online storage service (e.g., Amazon® Simple Storage Service (S3), Google® Cloud Storage, etc.) in which a catalog of thousands or millions of files is stored and/or accessed. In some embodiments, the data store 170 may be a data store that stores data and/or metadata as a plurality of files. In various embodiments, any number of data stores 170 (e.g., 170(1), 170(2), etc.) may be included in the video production system 100.

In some embodiments, data store 170 may store specific files that one or more endpoints may access via the network 104. In various embodiments, a manifest associated with the user may specify a subset of files in data store 170 that are accessible to the user. For example, a workflow management service, media orchestrator, or other device in the video production system 100 could analyze data associated with one or more workflows workflow pipelines, individual tasks, authorized users, etc.), and/or information that is associated with content items stored in the data store 170. Based on analysis of such information, the workflow manager could generate and/or update the manifest to list files and folders that are currently accessible to the user.

In another example, a media orchestrator in the video production system 100 could receive information from one or more media workflows associated with users of the video production system 100. Such information may be associated with one or more production workflows of various types. Such production workflow types may include, for example, production tasks that are to be performed by one or more users in relation to content items stored within the data store 170. A media workflow may be a production workflow that includes entries associated with various production tasks that are performed by one or more users. For a given production task, the media workflow may include an entry that specifies the content item as necessary for the user operating the endpoint device 102(1) to perform the production task, as well as information about the user assigned to perform a task (e.g., username, security path for key 129, etc.). In such instances, upon authenticating the user via key 129, the user may be granted access to the identified files and folders by providing the acquired workstation instance 164 (1) access to the identified files and folders.

In various embodiments, the data store 170 may store workstation data that is associated with the operation of workstations instances included in the workstation configuration server 150.

Generating a Workstation Pool

Figure 2:
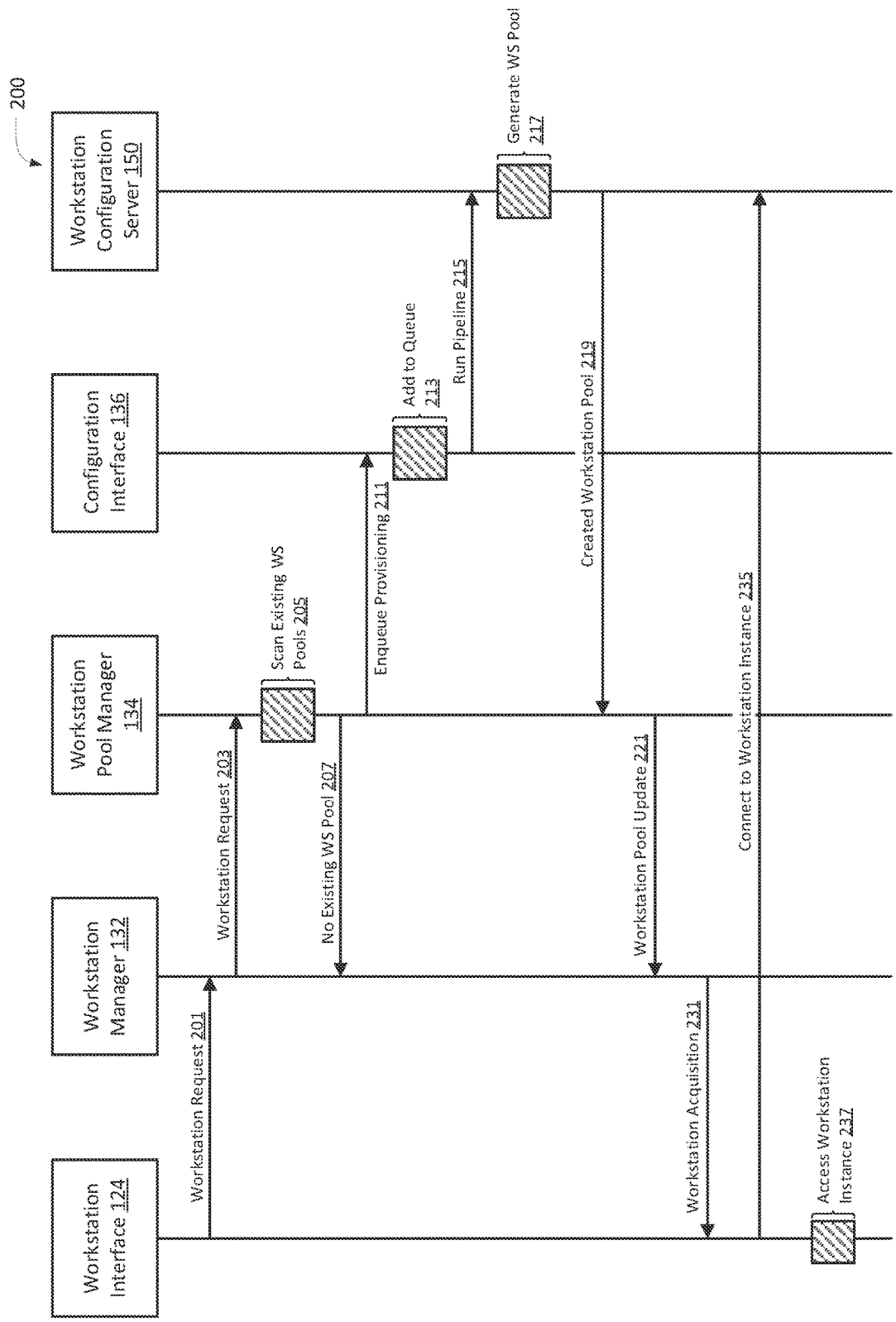
FIG. 2 illustrates a call flow diagram showing interactions between various components of the example distributed video production system of FIG. 1, according to various embodiments of the present disclosure.

FIG. 2 illustrates a call flow diagram 200 showing interactions between various components of the example distributed video production system 100 of FIG. 1, according to various embodiments of the present disclosure. One or more components of the distributed video production system 100 may perform various operations to respond to a request for a workstation instance having a specified configuration set by generating and assigning a workstation instance to the requesting device.

During the assignment of a workstation instance (e.g., WSI 164(1)) to an endpoint device (e.g., 102(1)), the workstation interface 124 included in the endpoint device 102(1) sends a workstation request message 201 to request the acquisition of a workstation instance that has a specified set of configuration settings. In various embodiments, the workstation request message 201 may include a set of configuration settings in a configuration set that specifies the configuration settings that the workstation instance is to possess. Such configuration settings may include, for example, a specific operating system type, remote display protocol type, package of installed applications, and so forth. In some embodiments, the workstation interface 124 may receive the set of configuration settings from a different device. For example, a manager for a team could initially generate a "team" configuration set for a group of team members on the endpoint device 102(2). The endpoint device 102(2) could transmit the team configuration set to other endpoint devices 102(1), 102(3) that are operated by other team members. In such circumstances, the team member using the endpoint device 102(1) could send the workstation request message 201 that includes the team configuration set and receive a different workstation instance (e.g., WSI 164(3)) that also is configured with the configuration settings specified in the team configuration set.

The workstation manager 132 receives the workstation request message 201 and transmits a corresponding workstation request message 203 to the workstation pool manager 134. The workstation pool manager 134 performs a scan 205 of the existing workstation pools to determine whether an existing and active workstation pool (e.g., the workstation pool 152) includes workstation instances 154 that have configuration settings matching those specified in the configuration set that is included in the workstation request message 203.

In various embodiments, the workstation pool manager 134 may maintain a list of existing workstation pools that are currently accessible in the workstation configuration server 150. Each of the existing workstation pools (e.g., workstation pool 152) maintains a set of identical workstation instances that share a common configuration. When the workstation pool manager 134 determines that no existing pool has workstation instances with configuration settings matching those specified in the configuration set of the workstation request message 203, the workstation pool manager 134 transmits a message 207 to the workstation manager 132 that indicates that there is no existing workstation pool for the requested configuration set.

The workstation pool manager 134 also responds to the determination by causing the workstation configuration server 150 to generate a new workstation pool (e.g., workstation pool 162) that includes workstation instances 164 that are configured with the configuration settings specified in the workstation request message 203. During the creation of a new workstation pool 162, the workstation pool manager 134 transmits a message 211 that includes the configuration set to the configuration interface 136 for the workstation configuration server 150. The message 211 causes the configuration interface to perform actions 213 to enqueue a task in a queue maintained at the configuration interface 136, where a queue processor included in the configuration interface 136 processes queue items associated. The enqueued task specifies that the workstation configuration server 150 is to provision a new workstation pool 162 that includes multiple workstation instances 164 that can be configured to have the configuration settings that are specified in the configuration set.

The configuration interface 136 transmits a message 215 to the workstation configuration server 150 to run a pipeline based on the enqueued task. In various embodiments, the configuration interface 136 may run a pipeline to perform functions that manipulate the infrastructure of the workstation configuration server 150. For example, the configuration interface 136 may run a pipeline that causes the workstation configuration server 150 to generate a new workstation pool 162 by creating multiple workstation instances (e.g., 164(1)-164(3)) that are each configured with the configuration settings specified in the configuration set.

The workstation configuration server 150 responds to the message 215 by performing various actions 217 to run the pipeline and generate a new workstation pool 162. In various embodiments, the workstation configuration server 150 may perform actions to generate a new workstation pool 162 by provisioning a group of workstation instances 164 that are configured with identical configuration settings. The group of identical workstation instances 164 are considered to be included in a common workstation pool 162 that corresponds to the identical configuration settings. In various embodiments, the workstation configuration server 150 may generate a unique workstation pool identifier (ID) for the new workstation pool 162. In such circumstances, the contents of the workstation pool ID may identify the configuration settings that correspond to the workstation pool 162. For example, a workstation pool ID could take the form of an address with sub-portions being hashes of the respective configuration settings.

Upon generating the new workstation pool 162, the workstation configuration server 150 sends a message 219 to the workstation pool manager 134 that indicates that the new workstation pool 162 has been created. In some embodiments, the message 219 includes the unique pool ID. In various embodiments, the workstation pool manager 134 may respond to the message 219 by adding the new workstation pool 162 to the list of existing workstation pools maintained by the workstation pool manager 134. In such cases, the workstation pool manager 134 may respond to subsequent requests for the same configuration set by identifying the workstation pool 162.

The workstation pool manager 134 reports the workstation pool update in a message 221 to the workstation manager 132. In various embodiments, the workstation pool manager 134 may generate a message 221 for each workstation instance 164 that was created to generate workstation pool 217. In some embodiments, the message 221 may identify the new workstation pool 162 as having workstation instances 164(1)-164(3) that are configured with the applicable configuration set. For example, the message 221 could include the pool ID that indicates each of the configuration settings specified in the configuration set. Alternatively, in some embodiments, the message 221 may include the originally-requested configuration set, along with a mapping of the new workstation pool 162 to the configuration set.

The workstation manager 132 transmits a message 231 that identifies an idle workstation instance (e.g., the workstation instance 164(1)) from the identified workstation pool 162. In some embodiments, the workstation pool update message 221 may identify a specific workstation instance 164(1) that is idle and available for assignment. For example, once the new workstation pool 162 is created, the workstation manager 132 could transmit a message 231 that identifies an idle workstation 164(1) from the newly-created workstation pool 162. Alternatively, in some embodiments, the workstation manager 132 may send a separate query message (not shown) to identify an idle workstation instance. Upon receiving information that identifies an idle workstation instance from an existing workstation pool (e.g., workstation pool 162 after the initial creation), the workstation manager 132 transmits a message to the workstation interface 124 that identifies the idle workstation instance 164(1) that is to be assigned to the endpoint device 102(1). In such instances, the workstation manager 132 may transmit message 231 much faster, as the workstation manager 132 does not need to wait for a full installation of a new workstation pool or new workstation instance.

The workstation interface 124 performs an action 235 to connect to the workstation configuration server 150 that stores the acquired workstation instance 164(1) that is assigned to the endpoint device 102. Upon connecting to the workstation configuration server 150, the workstation interface performs various actions 237 to access the acquired workstation instance 164(1).

In some embodiments, the endpoint device 102 may cause the configuration of the acquired workstation instance 164 (1) to be updated. For example, the endpoint device 102 could check the configuration to determine whether the configuration of the acquired workstation instance 164(1) matches the requested configuration and could determine that the requested configuration includes additional settings and/or software that is not included in the configuration for the acquired workstation instance 164(1). In such circumstances, the acquired workstation 164(1) may, upon acquisition, be updated to adhere to the additional settings and/or software that is specified by the requested configuration. For example, the endpoint device 102 could check the configuration of the acquired workstation instance 164(1), and could cause additional software to be installed in the acquired workstation instance 164(1) in order to have the requested configuration.

Figure 3:
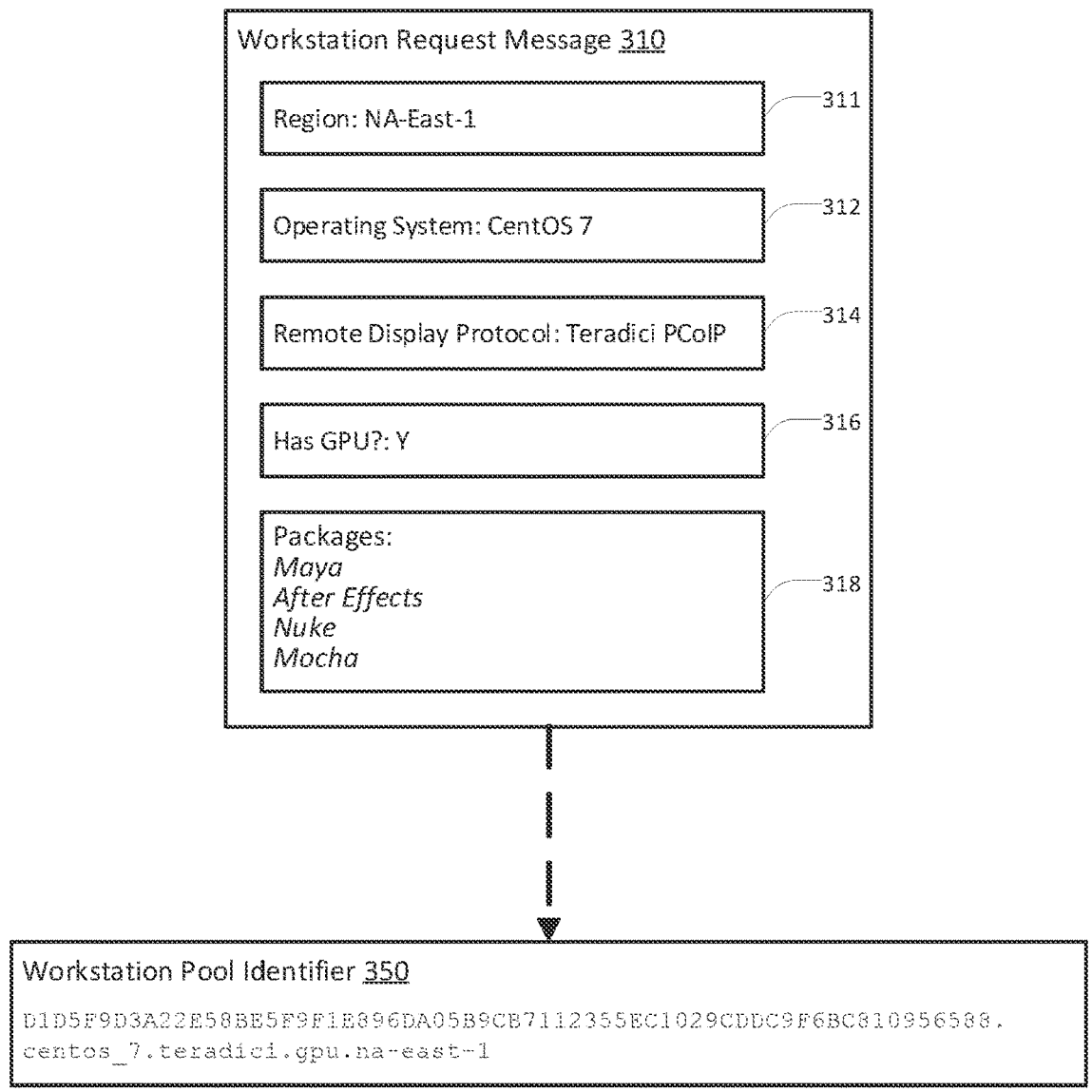
FIG. 3 illustrates an example workstation request message and a corresponding workstation pool identifier associated with a workstation pool that is included in the distributed video production system of FIG. 1, according to various embodiments of the present disclosure.

FIG. 3 illustrates an example workstation request message 310 and a corresponding workstation pool identifier 350 associated with a workstation pool that is included in the distributed video production system 100 of FIG. 1, according to various embodiments of the present disclosure. As shown, the workstation request message 310 includes a region field 311, an operating system type field 312, a remote display protocol type field 314, a graphical processing unit (GPU) presence field 316, and a packages field 318.

A workstation request message 310 is transmitted by the endpoint device 102 when requesting that the endpoint device 102(1) acquire a workstation instance having a particular set of configuration settings. The workstation request message 310 may correspond to the workstation request messages 201, 203 in FIG. 2. In such cases, the endpoint device 102 may cause the workstation interface 124 to transmit the workstation request message 310 to the workstation manager 132 in order to acquire a workstation instance that is configured with the configuration settings specified in the fields 311-318, which form the configuration set.

Fields 311-318 are individual values in a configuration set that specify the configuration settings that a workstation instance that is to be assigned to the endpoint device 102 is to possess. In various embodiments, when requesting to acquire a workstation instance, the endpoint device 102 may include a subset of the fields 311-318 in the workstation request message 310. In some embodiments, the workstation request message 310 may specify additional fields corresponding to other configuration settings. For example, a workstation request message 310 may also specify the disk size, machine type (e.g., CPU, GPU, memory, etc.), image project, image family, network, configuration settings for the operating system and/or software (e.g., environment variables) and so forth. In some embodiments, the workstation request message 310 may include fewer than fields 311-318 listed, or may include additional fields (e.g., separate fields for operating region and cloud provider).

A region field 311 specifies the region in which a target workstation instance is to be located. In various embodiments, the distributed video production system 100 may include sets of workstation configuration servers 150 (e.g., 150(1), 150(2), etc.) that are segregated into separate regions, where a given subset of workstation configuration servers provides remote services to a particular region. In such cases, the workstation configuration servers 150 in each operating region may separately generate and/or scale a given workstation pool 152 based on the distinct demands for the given workstation pool 152 in the respective operating regions. In such cases, the workstation pool manager 134 may refer to the region field 311 to scan existing workstation pools for a specific region. For example, the region field could specify a specific operating region (NA-East-1). The workstation pool manager 134 could then scan the list of workstation pools to determine whether the specific operating region has an existing workstation pool that has workstation instances corresponding to the configuration set.

An operating system type field 312 specifies the operating system that is to be installed on the target workstation. For example, the operating system type field 312 could specify a broad type of operating system (e.g., Linux, Windows, Apple OS X, etc.), or a specific implementation of an operating system (e.g., CentOS 7, CentOS 8, OS X 10 ["Yosemite"], OS X 11 ["Big Sur"]).

A remote display protocol (RDP) type field 314 specifies the type of remote display protocol that is used to display data provided by the target workstation instance. For example, the RDP type field 314 could specify a particular technology protocol, such as Teradici PC over IP (PCoIP), RemoteFX, Microsoft RDP, NICE DCV, and so forth. Additionally or alternatively, the RDP type field 314 may specify other details associated with the display protocol, such as the codec type(s) (e.g., types of bitmap and/or video codecs), as well as frame rate, data bandwidth, etc.

A graphical processing unit (GPU) presence field 316 specifies whether the target workstation instance is to have access to a GPU. For example, a GPU presence field 316 specifying "GPU" or "Yes" could indicate that a given workstation instance is connected to an integrated GPU (iGPU) or dedicated GPU (dGPU). that produces graphics data for display.

A packages field 318 specifies a package of one or more applications that are to be installed in a given workstation instance. In various embodiments, the packages field 318 may specify one or more applications, such as a package of various media applications 122, that are to be installed in a given workstation instance. In such cases, the workstation configuration server 150 may generate a given workstation instance by pre-installing each of the applications listed in the packages field 318 before the given workstation instance is identified as idle, or is acquired by a requesting endpoint device 102(1). In some embodiments, installing each of the applications listed in the packages field 318 may cause the endpoint device 102(1) to wait 10-15 minutes before acquiring a newly-generated workstation instance. For such circumstances, the workstation pool manager 134 may initially identify an existing idle workstation instance that has the package of applications already installed. When assigned the idle workstation, the endpoint device 102(1) may only need to wait 5-15 seconds to acquire the available workstation instance 164(1).

In some embodiments, the workstation configuration server 150 may wait to install each of the applications specified in the packages field 318 until the user confirms the package of applications is correct. In such instances, a user may apply changes to the applications listed in the packages field 318 and the workstation configuration server 150 may apply the changes upon the workstation instance 164(1) being assigned to the endpoint device 102(1).

Workstation pool identifier (ID) 350 provides a unique identifier for each workstation pool 152, 162. In some embodiments, each workstation pool ID 350 may be unique within a specific region. For example, workstation pools 152 having the same configuration within different regions could share a common workstation pool ID 350. Alternatively, the workstation pool ID 350 may be unique for each workstation pool across multiple regions. For example, a given workstation pool ID 350 could be generated based on a specific region value (e.g., the NA-East-1 region).

In various embodiments, the workstation pool manager 134, the configuration interface 136, and/or the workstation configuration server 150 may generate the workstation pool ID 350 based on the values in the configuration set. For example, the workstation configuration server 150 may generate a workstation pool ID that includes a hash derived from the list of applications included in the packages field 318. In some embodiments, the workstation pool ID 350 may take the form of an address that specifies values for each of the fields 311-318 included in the configuration set. For example, as shown, the workstation pool ID 350 is an address that lists the values specified in fields 311, with the first portion of the workstation pool ID 350 being a SHA-256 hash of the listed applications in the packages field 318.

In various embodiments, the workstation pool manager 134 may generate a key based on the workstation request message 310 in order to scan the list of existing workstation pools. In such cases, the workstation pool manager 134 may determine that the workstation configuration server 150 has an existing workstation pool matching the configuration set in the workstation request message 310 when the key matches a workstation pool ID included in the list of existing workstation pools.

Scaling of Workstation Pools

Figure 4:
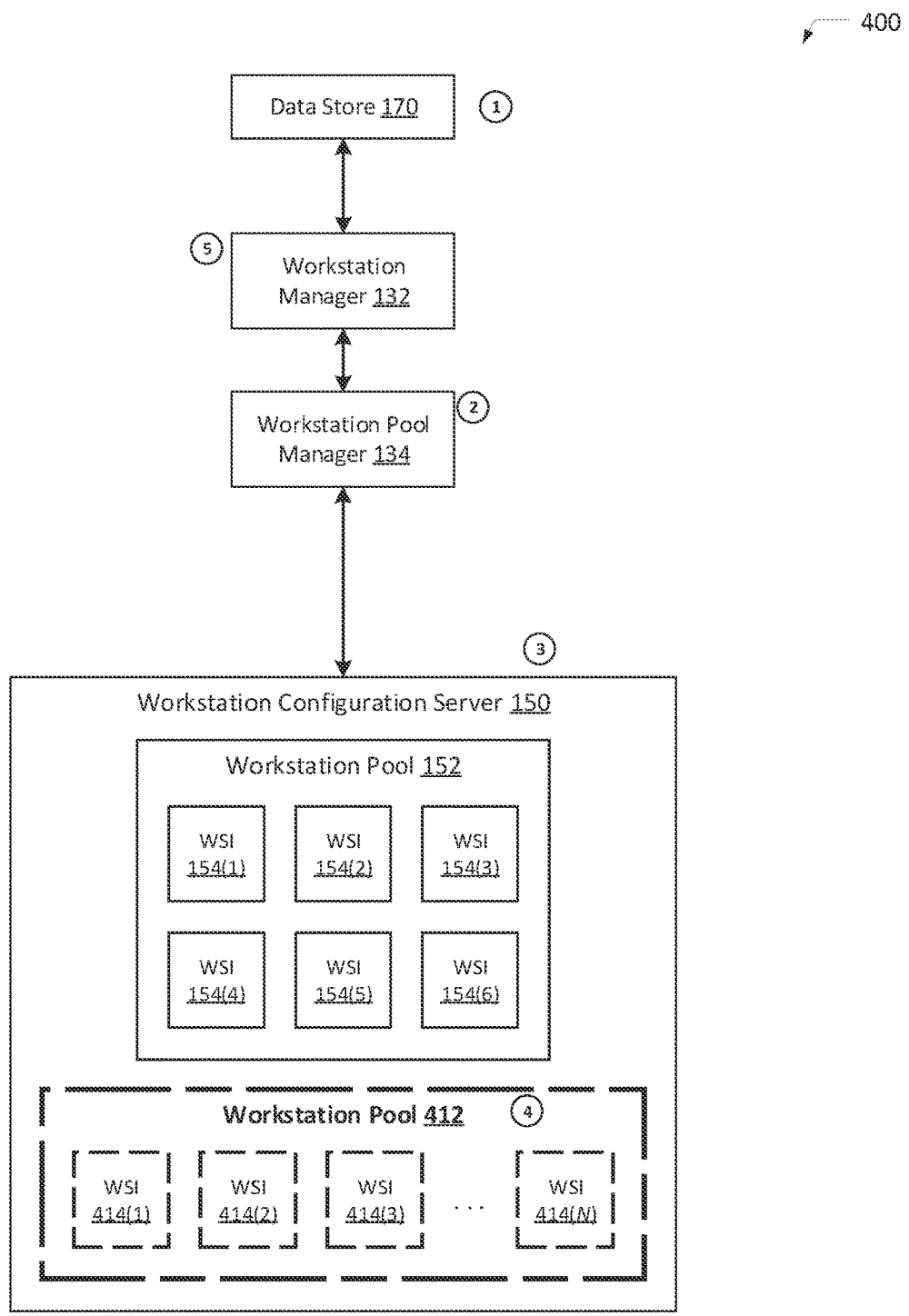
FIG. 4 illustrates a more detailed illustration of a technique to schedule the creation of a workstation pool that is performed by various devices included in the distributed video production system of FIG. 1, according to various embodiments of the present disclosure.

FIG. 4 illustrates a more detailed illustration of a technique to schedule the creation of a workstation pool that is performed by various devices included in the distributed video production system 100 of FIG. 1, according to various embodiments of the present disclosure. As shown, one or more components of the distributed video production system 400 include the data store 170, the workstation manager 132, the workstation pool manager 134, and the workstation configuration server 150. The workstation configuration server 150 includes existing workstation pool 152 including workstation instances 154 (e.g., WSIs 154(1)-154(6)) and new workstation pool 412 including workstation instances 414 (e.g., WSIs 414(1), 414(2), . . . 414(N)).

In operation, the workstation pool manager 134 analyzes workstation data, stored in the data store 170, that is associated with the workstation instances (e.g., existing workstation pool 152) included in the workstation configuration server 150. The workstation pool manager 134 analyzes the workstation data in order to determine requests that are likely to be sent by endpoint devices 102 for a particular configuration set. Based on that determination, the workstation pool manager 134 may determine the quantity of idle workstation instances of a given configuration that need to be available in order to quickly assign such idle workstation instances requesting endpoint devices 102; the workstation manager may also determine a scheduled time that the idle workstation instances are to be made available.

For example, the workstation pool manager 134 could process workstation data stored in data store 170 (e.g., historical data like workstation logs, previous workstation request messages, previous connections to workstation instances, etc.) in order to identify specific configuration sets that will or will not be requested over a given period. The workstation pool manager 134 could then cause the workstation configuration server 150 to generate, scale, and/or decommission specific workstation pools in order to efficiently manage the available processing resources of the workstation configuration server 150. Such scaling ensures that multiple workstation instances are available to be acquired by requesting endpoint devices 102 without the workstation pool manager 134 first receiving a workstation request message 201 for a given configuration set.

In various embodiments, the workstation data may include logs of previous operations performed on the workstation instances. In some embodiments, the workstation data may include other information associated with accessing the workstation instances such as key management and authentication data. In various embodiments, the workstation pool manager 134 may analyze the workstation data in order to determine the number of requests that are likely to be sent by endpoint devices 102 for a particular configuration set during a certain time period. Based on that determination, the workstation pool manager 134 may determine the quantity of idle workstation instances of a given configuration that need to be available, as well as a scheduled time that the idle workstation instances are to be available. In some embodiments, the workstation data may include data associated with historical access patterns over defined periods. In some embodiments, the workstation pool manager 134 may determine the historical access patterns from previously-received requests for a configuration set. In some embodiments, the access patterns may be timestamped, such that historical access patterns occurring within the past hour, day, week, month, or defined time period, may be processed, and determined by the workstation pool manager 134.

For example, the workstation data could include request logs that indicate that 10-15 endpoints regularly request workstation instances from the workstation pool 152 within a one-hour period each day. In such instances, the workstation pool manager 134 could identify a scheduled time as the time that the workstation pool manager 134 is likely to receive requests for workstation instances for workstation pool 152. Based on the scheduled time, the workstation pool manager 134 may cause the workstation configuration server 150 to generate enough workstation instances to have 15 workstation instances available for assignment by the scheduled time.

For explanatory purposes only, a series of numbered bubbles labeled 1-5 depicts an example series of operations that occur when the workstation pool manager 134 scales the creation of a workstation pool 412 in the workstation configuration server 150 based on historical data.

As depicted with the bubble numbered 1, the workstation pool manager 134 retrieves workstation data from data store 170. In various embodiments, the workstation manager 132 and/or the workstation pool manager 134 may transmit various workstation data to data store 170. Such workstation data may include workstation task records, log data like connection times to the workstation configuration server 150, previous configuration sets, previous workstation request messages 310, and so forth. In some embodiments, portions of the workstation data may be timestamped and/or associated with various attributes, such as operating region.

In various embodiments, the workstation pool manager 134 may retrieve a subset of the workstation data stored in the data store 170 in order to manage the contents of the workstation configuration server 150. In such cases, the workstation pool manager 134 may determine the types of workstation instances that are in high demand and, conversely, which workstation instances have been inactive for significant periods. The workstation pool manager 134 may then scale one or more workstation pools in order to manage the memory and processing resources of the workstation configuration server 150 more efficiently by providing more resources to in-demand workstation pools.

As depicted with the bubble numbered 2, the workstation pool manager 134 processes the retrieved workstation data.

In some embodiments, the workstation pool manager 134 may process the retrieved workstation data in order to determine workstation instances to make available. Making certain workstation instances available in anticipation of workstation requests messages for that type of workstation instance greatly decreases the time associated with responding to a given request.

For example, the workstation pool manager 134 may process workstation request messages 310 that were received in the previous three hours within a given operating region in order to determine the most highly-requested configuration sets for that specific region. Upon identifying the most highly-requested configuration sets, the workstation pool manager 134 may then determine whether an existing workstation pool, such as existing workstation pool 152, corresponds to any of the identified configuration sets. If the workstation pool manager 134 determines that an existing workstation pool remains active in the workstation configuration server 150, the workstation pool manager 134 may also determine how many workstation instances are available to be assigned.

As depicted with the bubble numbered 3, the workstation pool manager 134 transmits a message to the workstation configuration server 150 to generate a new workstation pool. In some embodiments, the workstation pool manager 134 may determine that the workstation configuration server 150 does not have an active configuration pool that corresponds to an identified configuration set. In such cases, the workstation pool manager 134 may generate a message that causes the workstation configuration server 150 to generate a new workstation pool. In some embodiments, the workstation pool manager 134 may include information in the message that causes the workstation configuration server 150 to generate the new workstation pool at a specific time. In such circumstances, the workstation pool manager 134 may specify a specific scheduled time, or may transmit the message to the workstation configuration server 150 at a specific time, in order to ensure that the workstation instances are available at the scheduled time.

For example, the workstation pool manager 134 could determine that a specific configuration set, such as a team configuration set common to a visual effects team, becomes highly-requested (e.g., at least N requests for the team configuration set) at a specific hour each day within the past month. The workstation pool manager 134 could determine whether the workstation configuration server 150 currently has an existing workstation pool corresponding to the team configuration set. When the workstation pool manager 134 determines that the workstation configuration server 150 does not include a workstation pool corresponding to the team configuration set, the workstation pool manager 134 could transmit a message that causes the workstation configuration server 150 to generate a new workstation pool 412, with each workstation instance 414 being configured with the configuration settings included in the team configuration set. In some embodiments, the workstation pool manager 134 may also specify, in the message to the workstation configuration server 150, that N quantity of workstation instances be created and remain available by a scheduled time.

As depicted with the bubble numbered 4, the workstation configuration server 150 generates a new workstation pool 412. In various embodiments, the workstation configuration server 150 may perform various tasks to manage the contents of workstation configuration server 150. In some embodiments, the workstation pool manager 134 may transmit a message to a configuration interface 136 that queues the pipeline associated with managing the contents of the workstation configuration server 150.

When the configuration interface 136 processes the message from the workstation pool manager 134 that includes the instructions to generate a new workstation pool, the configuration interface 136 runs a pipeline that causes the workstation configuration server 150 to generate a new workstation pool 412 that includes N quantity of workstation instances 414. Each of the workstation instances 414 included in the workstation pool 412 are configured in accordance with the configuration settings specified in the team workstation set. In various embodiments, the configuration of each WSI 414 includes an installation of the list of applications specified in the team configuration set. In some embodiments, the workstation instance may also include an installation signature that includes the application name and version for each application installed at the workstation instance 414.

As depicted with the bubble numbered 5, the workstation pool manager 134 reports the new workstation pool 412 to the workstation manager 132. Upon the workstation configuration server 150 generating the new workstation pool 412, the workstation pool manager 134 may receive a message transmitted from the workstation configuration server 150 that indicates that the new workstation pool has been created. In some embodiments, the message includes a workstation pool ID 350 that uniquely identifies the new workstation pool 412. The workstation pool manager 134 may then transmit a message that indicates that the new workstation pool 412 has been created. The message may also specify the configuration for the group of the newly-created workstation instances 414.

Using the above-described technique, the workstation pool manager 134 may, in various embodiments, scale up the quantity of workstation instances having a specific configuration in anticipation of receiving requests for specific configuration sets.

Figure 5:
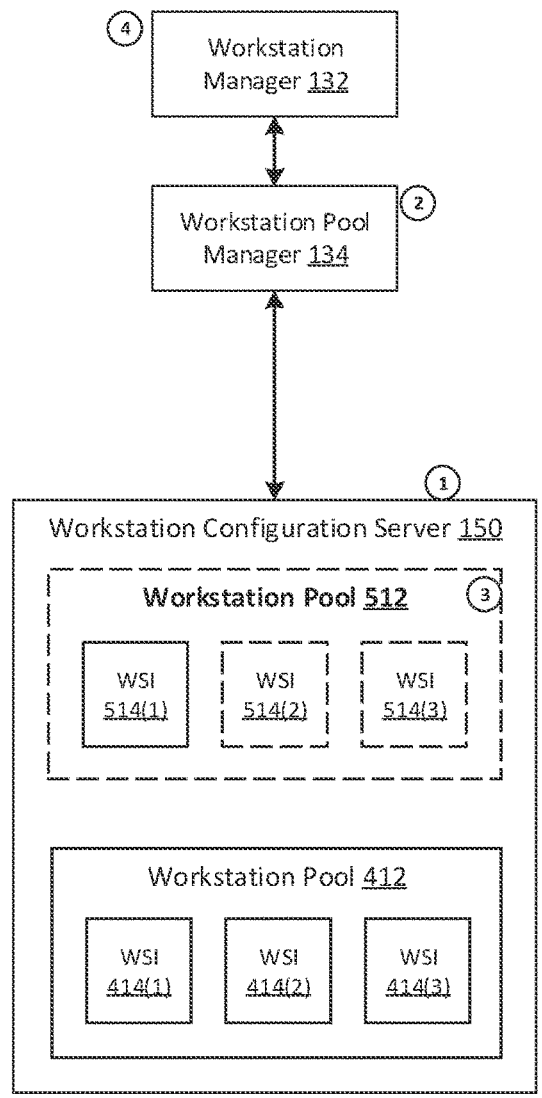
FIG. 5 illustrates a more detailed illustration of a technique to decommission a workstation pool that is performed by various devices included in the distributed video production system of FIG. 1, according to various embodiments of the present disclosure.

FIG. 5 illustrates a more detailed illustration of a technique to decommission a workstation pool that is performed by various devices included in the distributed video production system 100 of FIG. 1, according to various embodiments of the present disclosure. As shown, one or more components of the distributed video production system 500 include the workstation manager 132, the workstation pool manager 134, and the workstation configuration server 150. The workstation configuration server 150 includes an existing workstation pool 512 that includes multiple workstation instances 514 (e.g., WSIs 514(1)-514(3)) and an existing workstation pool 412 including multiple workstation instances 414 (e.g., WSIs 414(1), 414(2), 414(3)).

In operation, the workstation pool manager 134 analyzes workstation data, provided by the workstation configuration server, that is associated with the workstation instances 414, 514 included in the workstation configuration server 150. The workstation pool manager 134 analyzes the workstation data in order to determine which available workstation instances are idle and whether an existing workstation pool can be decommissioned.

For example, the workstation pool manager 134 could process the workstation data that corresponds to a recent period (e.g., workstation logs for the previous hour) in order to identify specific workstation instances that have remained idle and unassigned to any endpoint device 102. Based on analyzing the workstation data, the workstation pool manager 134 may identify the idle workstation instances and cause specific workstation instances, or entire workstation pools, to be decommissioned from the workstation configuration server 150. Decommissioning the workstation instance or workstation pool from the workstation configuration server 150 frees memory and processing resources, and the workstation pool manager 134 deletes the decommissioned workstation pool from a list of existing workstation pools. Should the workstation pool manager 134 subsequently receive a request for a workstation instance having the configuration of the deleted workstation pool, the workstation pool manager 134 may then cause the workstation configuration server 150 to recreate the workstation pool.

For explanatory purposes only, a series of numbered bubbles labeled 1-4 depicts an example series of operations that occur when the workstation pool manager 134 decommissions a workstation pool 512 included in the workstation configuration server 150.

As depicted with the bubble numbered 1, the workstation pool manager 134 receives workstation data from the workstation configuration server 150. In some embodiments, the workstation pool manager 134 may also receive workstation data from other sources, such as the workstation manager 132 and/or the data store 170. In various embodiments, the workstation pool manager 134 receives the workstation data in order to identify inactive workstation instances, such as idle workstation instances 514 that have been available, yet unassigned to any endpoint device 102, for over a threshold time period.

As depicted with the bubble numbered 2, the workstation pool manager 134 analyzes the received workstation data in order to identify inactive workstation instances that can be decommissioned from the workstation configuration server 150. For example, the workstation pool manager 134 could identify an unassigned workstation instance 514(1) as inactive when the workstation instance 514(1) has not been assigned to any endpoint device 102 for over a threshold period of one day. In such cases, the workstation pool manager 134 could identify the workstation instance 514(1) as inactive and subject to deletion.

In some embodiments, the workstation pool manager 134 may refrain from causing an inactive workstation instance from being deleted if doing so would keep the workstation pool from possessing the threshold number of available workstation instances. For example, the workstation pool 512 could be required to maintain a threshold quantity of three available workstation instances 514 (e.g., WSIs 514(1)-514(3)). When the workstation pool manager 134 determines that WSI 514(3) is inactive, the workstation pool manager 134 may abstain from marking the WSI 514(3) for deletion.

Alternatively, the workstation pool manager 134 may cause the workstation pool 512 to be commissioned when identifying an inactive workstation instance would cause the workstation pool to possess fewer than the threshold number of available workstation instances. For example, the workstation pool 512 could be required to maintain a threshold quantity of three available workstation instances 514 (e.g., WSIs 514(1)-514(3)). When the workstation pool manager 134 determines that WSI 514(3) is inactive, the workstation pool manager 134 may cause all the unassigned workstation instances 514(1)-514(3) to be identified as inactive and marked for deletion. The workstation pool manager 134 may also decommission the workstation pool 512.

As depicted with the bubble numbered 3, the workstation configuration server 150 decommissions the workstation pool 512. In various embodiments, the workstation configuration server 150 may receive a message from the workstation pool manager 134 that identifies a workstation instance 514(1) to treat as inactive, or a workstation pool 512 to decommission. When the workstation configuration server 150 marks a workstation instance 514(1) as inactive, the workstation configuration server 150 marks the workstation instance 514(1) for deletion and removes any addresses associated with the workstation instance 514(1). In such cases, the workstation pool manager 134 may subsequently transmit requests to generate new workstation instances 514(3) instead of reconnecting to the inactive workstation instance 514(1). When the workstation pool manager 134 marks the workstation pool 512 for deletion, the workstation configuration server 150 marks each workstation instance 514(1)-514(3) in the workstation pool 512 for deletion and removes any addresses associated with each of the workstation instances 514(1)-514(3).

As depicted with the bubble numbered 4, the workstation pool manager 134 removes the decommissioned workstation pool 512 from a list of existing workstation pools. In various embodiments, the workstation pool manager 134 may update a list of existing workstation pools by removing the workstation pool ID from the list of existing workstation pools. In such cases, the workstation pool manager may respond to subsequent requests for workstation instances from the decommissioned workstation pool 512 by causing the workstation configuration server 150 to recreate the workstation pool 512.

Figure 6:
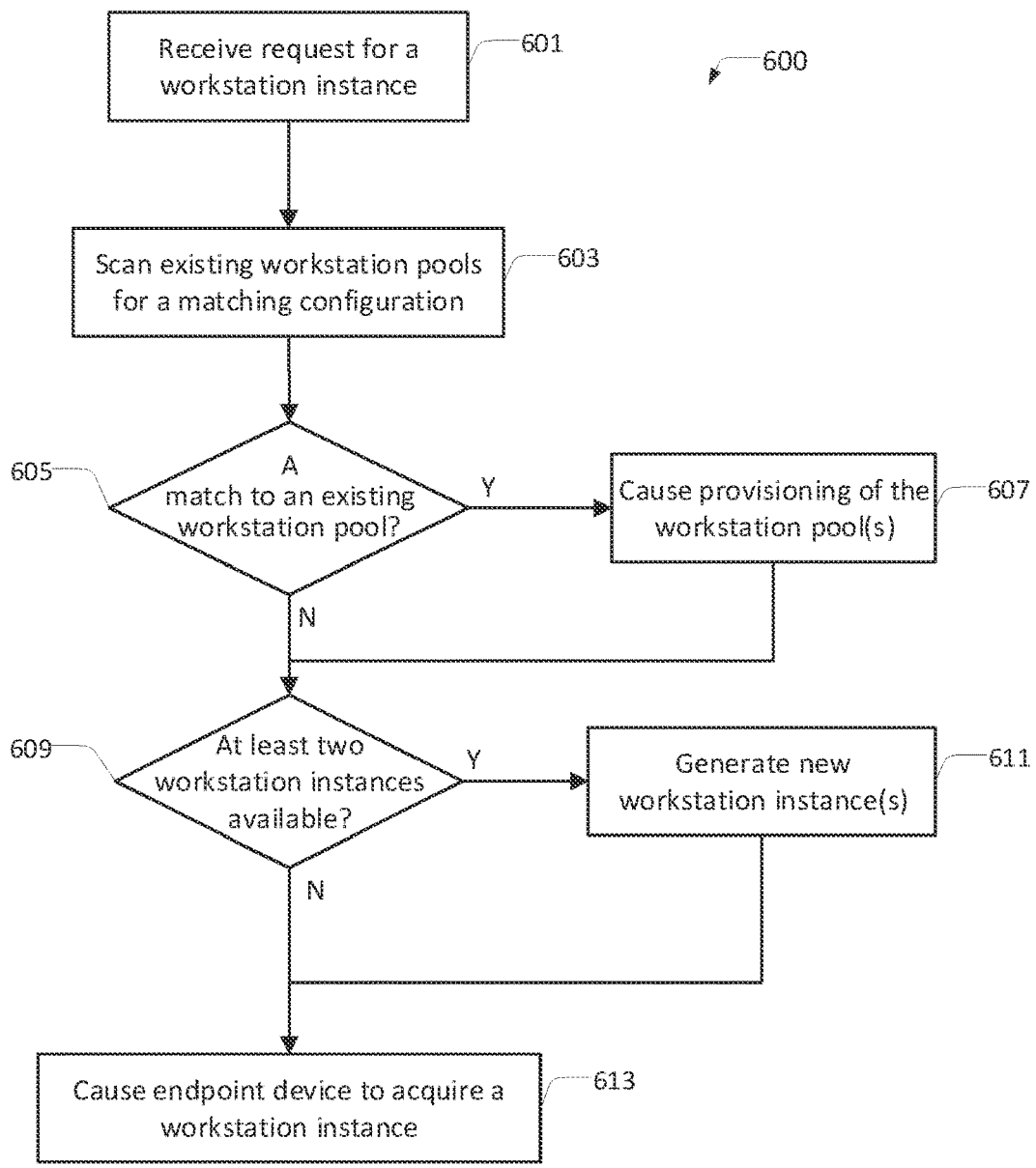
FIG. 6 sets forth a flow diagram of method steps for provisioning a workstation instance from a workstation pool performed by various devices included in the distributed video production system of FIG. 1, according to various embodiments of the present disclosure.

FIG. 6 sets forth a flow diagram of method steps for provisioning a workstation instance from a workstation pool performed by various devices included in the distributed video production system 100 of FIG. 1, according to various embodiments of the present disclosure. Although the method steps are described with reference to the systems and call flows of FIGS. 1-5, persons skilled in the art will understand that any system configured to implement the method steps, in any order, falls within the scope of the present disclosure.

Method 600 begins at step 601, where a workstation pool manager 134 receives a request for a workstation instance. In various embodiments, an endpoint device 102 transmits a workstation request message 310, received by the workstation pool manager 134 via the workstation manager 132, that requests the acquisition of a workstation instance that has a specific set of configuration settings ("configuration set"). In some embodiments, the endpoint device 102 generates the configuration set when by specifying a configuration needed for a given work session. In alternative embodiments, the endpoint device 102 may receive the configuration set from a different device. For example, a manager for a team could initially generate a team configuration set for a group of team members and transmit the team configuration set to other team members. In such circumstances, a team member using a different endpoint device 102 could send the workstation request message 201 that includes the team configuration set.

At step 603, the workstation pool manager 134 scans existing workstation pools for a matching configuration. In various embodiments, the workstation pool manager 134 may scan information associated with a workstation configuration server 150 for a given region in order to determine whether the workstation configuration server 150 includes an existing and active workstation pool (e.g., the workstation pool 152) that includes workstation instances with configurations matching the configuration set in the received workstation request message 310.

At step 605, the workstation pool manager 134 determines whether an existing workstation pool matches the configuration set. In some embodiments, the workstation pool manager 134 may maintain a list of existing workstation pools that are currently accessible in the workstation configuration server 150. In such cases, the workstation pool manager 134 scans the list using the configuration set as keywords to identify pool identifiers and/or configurations that match the configuration set. When the workstation pool manager 134 determines that the configuration set matches the configuration of an existing workstation pool 152, the workstation pool manager proceeds to step 609. Otherwise, when the workstation pool manager 134 determines that no workstation pool having workstation instances with configurations matching the configuration set exists, the workstation pool manager 134 proceeds to step 607.

At step 607, the workstation pool manager 134 causes the workstation configuration server 150 to provision a new workstation pool based on the configuration set. In various embodiments, the workstation pool manager 134 may respond to the determination made at step 605 by causing the workstation configuration server 150 to generate a new workstation pool (e.g., workstation pool 162) that includes workstation instances that are configured to match the configuration set specified in the workstation request message 310.

For example, the workstation pool manager 134 could transmit a message including the configuration set to a configuration interface 136 for the workstation configuration server 150. A queue processor included in the configuration interface 136 could process the message by enqueueing a task specifying that the workstation configuration server 150 is to provision a new workstation pool (e.g., a workstation pool 162) that includes multiple workstation instances (e.g., workstation instances 164(1)-164(3)) that are to be configured with the configuration settings specified in the configuration set. The configuration interface 136 could then run a pipeline that causes the workstation configuration server 150 to generate a new workstation pool 162 by creating multiple workstation instances 164(1)-164(3) that are each configured with the configuration settings specified in the configuration set. Upon causing the workstation configuration server 150 to provision the new workstation pool 162, the workstation pool manager 134 proceeds to step 609.

At step 609, the workstation pool manager 134 determines whether at least two workstation instances of the workstation pool are available. In various embodiments, the workstation pool manager 134 may dynamically scale individual workstation pools based on the demand for particular workstations. The workstation pool manager 134 may cause the workstation configuration server 150 to generate new workstation instances in order to ensure that a threshold quantity of workstation instances for a given workstation pool exist and remain available by not assigning the workstation instance to a particular endpoint device. In such circumstances, the workstation pool manager 134 may respond to a workstation request message 310 by assigning one of the available workstation instances, greatly decreasing the latency in responding to requests that would otherwise occur with generating a new workstation instance.

For example, the workstation pool manager 134 could determine whether a minimum quantity of workstation instances 164 for a given workstation pool 162 remain available. In some embodiments, the minimum quantity of available workstations may be at least two; in other embodiments, the minimum quantity of available workstations may differ (e.g., at least 3 per region for a given workstation pool). In the above example, the workstation pool manager 134 could determine that assigning a given workstation instance 164(1) caused the workstation pool 162 to have a quantity of available workstation instances 164 fall below the threshold quantity. When determining that the quantity of available workstation instances had fallen below the threshold quantity, the workstation pool manager proceeds to step 611. Otherwise, the workstation pool manager proceeds to step 613.

At step 611, the workstation pool manager 134 causes the workstation configuration server 150 to generate one or more new workstation instances. In various embodiments, the workstation pool manager 134 may transmit messages that cause the workstation configuration server 150 to generate one or more new workstation instances for a given workstation pool in order to ensure that a threshold quantity of workstation instances remains available for assignment to endpoint devices. Upon causing the workstation configuration server 150 to generate the requisite quantity of workstation instances 164 (e.g., generating workstation instance 164(3) such that workstations instances 164(2), 164(3) are available), the workstation pool manager 134 proceeds to step 613.

At step 613, the workstation pool manager 134 causes the endpoint device 102 to acquire a workstation instance. In various embodiments, the workstation pool manager 134 may transmit a message that identifies an available workstation instance (e.g., the workstation instance 164(1)) from an applicable workstation pool 162. In some embodiments, the workstation pool manager 134 may generate a workstation pool update message 221 that identifies a specific workstation instance 164(1) that is available for assignment. Alternatively, in some embodiments, the workstation manager 132 may send a separate query message to identify an available workstation instance from the applicable workstation pool 162. Upon receiving information that identifies an available workstation instance 164(1), the workstation manager 132 transmits a message to the endpoint device that identifies the workstation instance 164(1) as assigned to the endpoint device 102. In some embodiments, the endpoint device 102 may access the acquired workstation instance 164(1) via a workstation interface 124 included in the endpoint device 102.

Content Delivery System Overview

Figure 7:
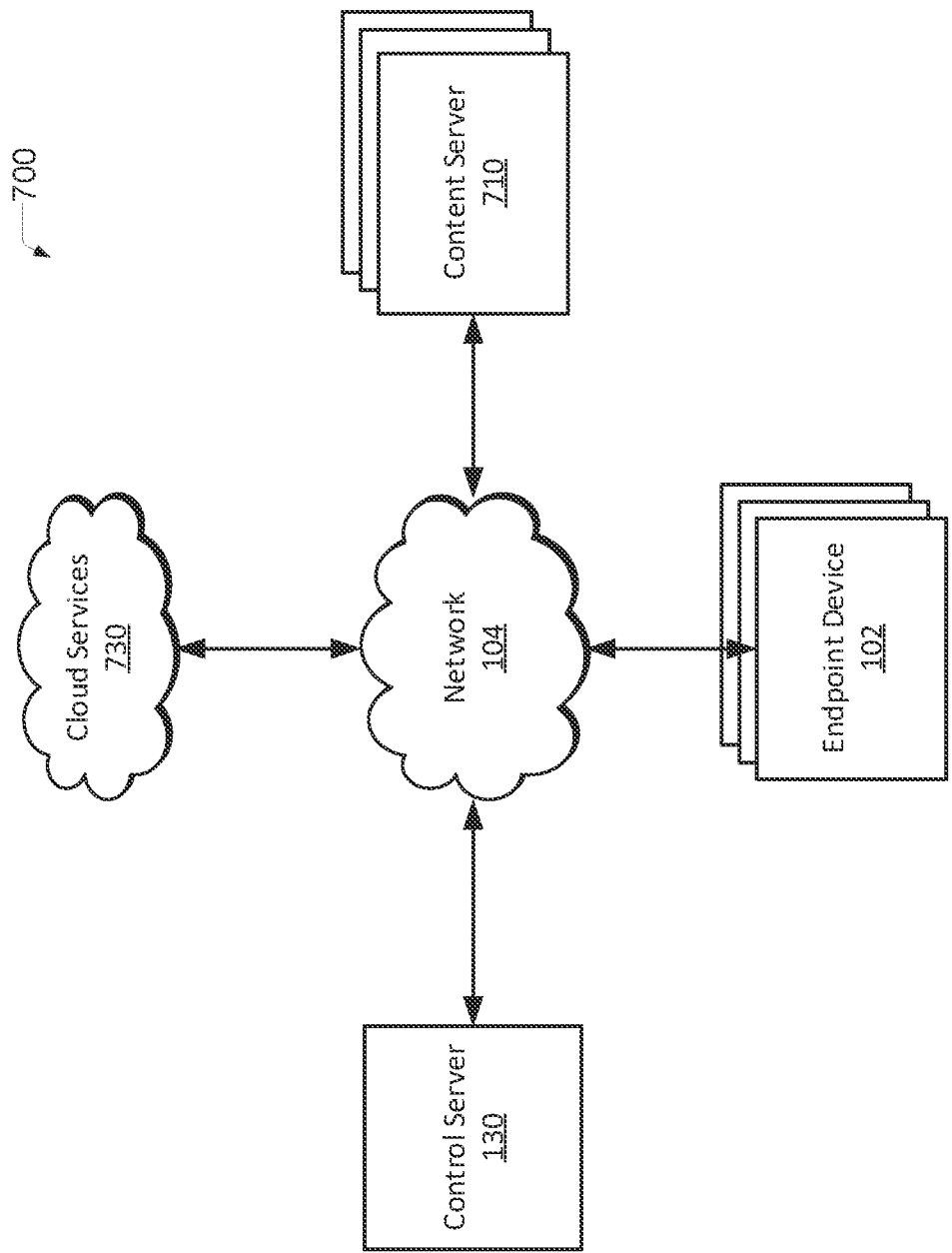
FIG. 7 illustrates another example network infrastructure that is configured to implement one or more aspects of the present disclosure.

FIG. 7 illustrates a network infrastructure 700, according to various embodiments of the disclosure. As shown, the network infrastructure 700 includes content servers 710, a control server 130, and endpoint devices 102, each of which are connected via the communications network 104. The network infrastructure 700 is configured to distribute content to content servers 710, and such content is then distributed on demand to endpoint devices 102. In various embodiments, the video production system 100 of FIG. 1 may be included in the network infrastructure 700.

Each endpoint device 102 communicates with one or more content servers 710 (also referred to as "caches" or "nodes") via the network 104 to download content, such as textual data, graphical data, audio data, video data, and other types of data. The downloadable content, also referred to herein as a "file," is then presented to a user of the one or more endpoint devices 102. In various embodiments, the endpoint devices 102 may include computer systems, content review systems, set-top boxes (STBs), mobile computers, smartphones, tablets, console and handheld video game systems, digital video recorders (DVRs), DVD players, connected digital TVs, dedicated media streaming devices (e.g., the Roku® set-top box), serverless compute engines, and/or any other technically-feasible computing platform that has network connectivity. In various embodiments, the endpoint device 102 is capable of presenting content, such as text, images, audio, and/or video content, to a user. In various embodiments, the endpoint device 102 may execute one or more applications to perform various video production techniques on downloaded content.

Each content server 710 could include, for example, a web server, a database (DB), and/or a server application configured to communicate with the control server 130 to determine the availability and location of various files that are tracked and managed by the control server 130. In various embodiments, each content server 710 may further communicate with cloud services 730 and one or more other content servers 710 in order to "fill" each content server 710 with copies of various files. In addition, the content servers 710 may respond to requests for files received from one or more endpoint devices 102. The files may then be distributed from the content server 710, or via a broader content distribution network (CDN). In some embodiments, the content servers 710 enable a user to authenticate his or her identity (e.g., using a username and password) in order to access files stored on the content servers 710. Although only one control server 130 is shown in FIG. 7, in various embodiments, multiple control servers 130 (e.g., control server 130(1), 130(2), etc.) may be implemented to track and manage files.

In various embodiments, the cloud services 730 may include an online storage service (e.g., Amazon® Simple Storage Service, Google® Cloud Storage, etc.) in which a catalog of thousands or millions of files is stored in object storage 160 and data store 170 and/or accessed from object storage 160 and data store 170 in order to fill the content servers 710. The cloud services 730 also may provide computing and/or other processing services. Although only one cloud service 730 is shown in FIG. 1, in various embodiments, multiple cloud services 730 (e.g., cloud service 730(1), 730(2), etc.) may be implemented.

Figure 8:
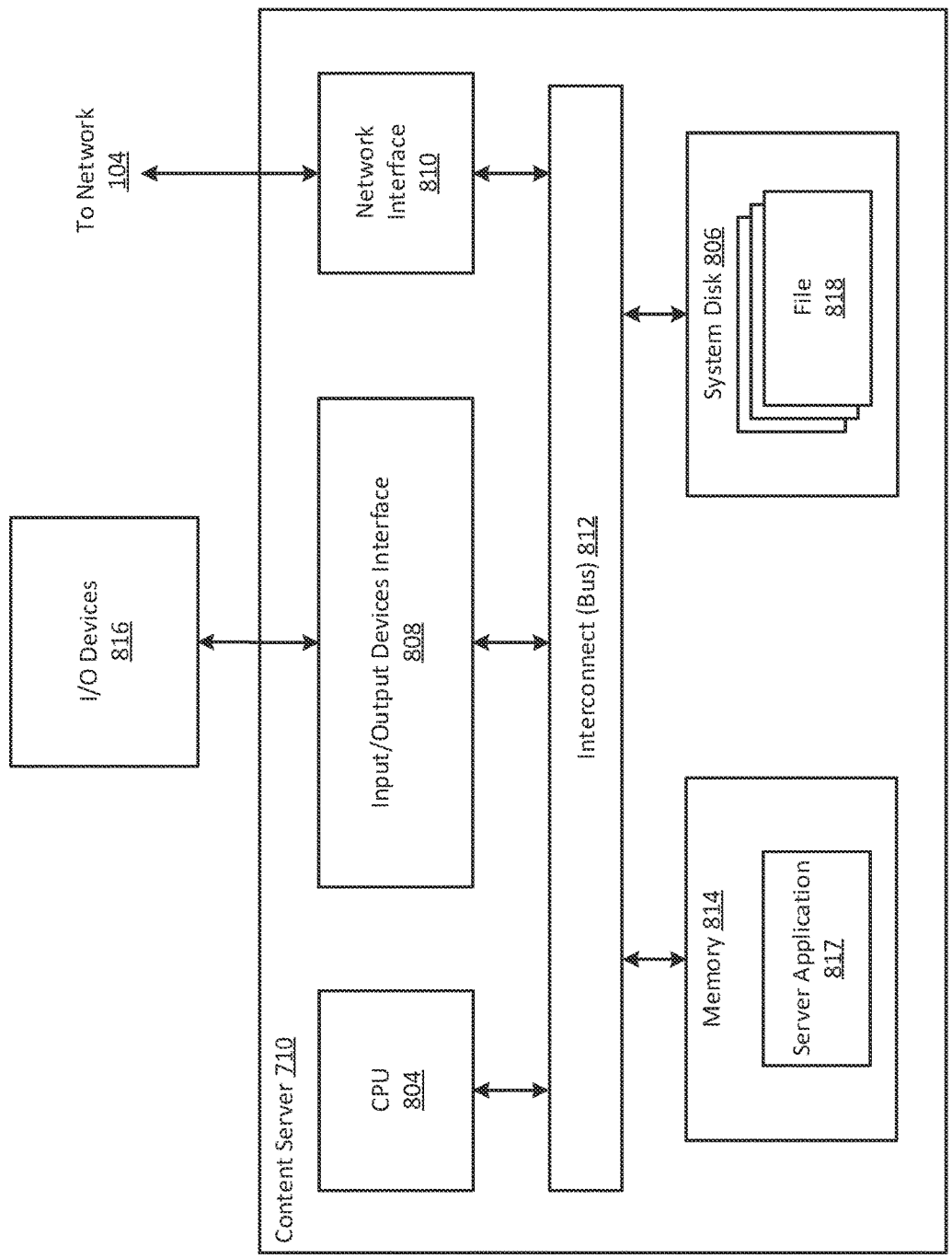
FIG. 8 is a more detailed illustration of the content server of FIG. 7, according to various embodiments of the present disclosure.

FIG. 8 is a more detailed illustration of the content server 710 of FIG. 7, according to various embodiments of the present disclosure. As shown, the content server 710 includes, without limitation, a central processing unit (CPU) 804, a system disk 806, an input/output (I/O) device interface 808, a network interface 810, an interconnect (bus) 812, and a system memory 814.

The CPU 804 is configured to retrieve and execute programming instructions, such as the server application 817, stored in the system memory 814. Similarly, the CPU 804 is configured to store application data (e.g., software libraries) and retrieve application data from the system memory 814. The interconnect 812 is configured to facilitate transmission of data, such as programming instructions and application data, between the CPU 804, the system disk 806, the I/O device interface 808, the network interface 810, and the system memory 814. The I/O device interface 808 is configured to receive input data from one or more I/O devices 816 and transmit the input data to the CPU 804 via the interconnect 812. For example, the one or more I/O devices 816 could include one or more buttons, a keyboard, a mouse, and/or other input devices. The I/O device interface 808 is further configured to receive output data from the CPU 804 via the interconnect 812 and transmit the output data to the one or more I/O devices 816.

The system disk 806 may include one or more hard disk drives (HDDs), solid-state storage devices (SSDs), and/or similar storage devices. The system disk 806 is configured to store nonvolatile data, such as one or more files 818 (e.g., audio files, video files, subtitles, application files, software libraries, etc.). The files 818 can then be retrieved by the one or more endpoint devices 102 via the network 104. In some embodiments, the network interface 810 is configured to operate in compliance with one or more communications standards, such as the Ethernet standard, the Bluetooth standard, and/or one or more wireless communication standards.

The system memory 814 includes the server application 817, which configures the content server 710, to service requests received from the endpoint device 102 and other the content servers 710. For example, the service request could be for the one or more files 818. When the server application 817 receives a service request for a specific file, the server application 817 retrieves the corresponding file 818 from the system disk 806 and transmits the file 818 to the endpoint device 102 and/or the content server 710 via the network 104.

The file 818 could, for example, be one of a plurality of digital items, such visual content items like videos and/or still images. Similarly, the file 818 could be one of a plurality of textual content items associated with one or more visual content items, such as movie metadata. In various embodiments, the file 818 may be a one of a plurality of secure application data items associated with one or more content items and/or applications being executed by the content server 710, the control server 130, and/or the endpoint device 102.

Figure 9:
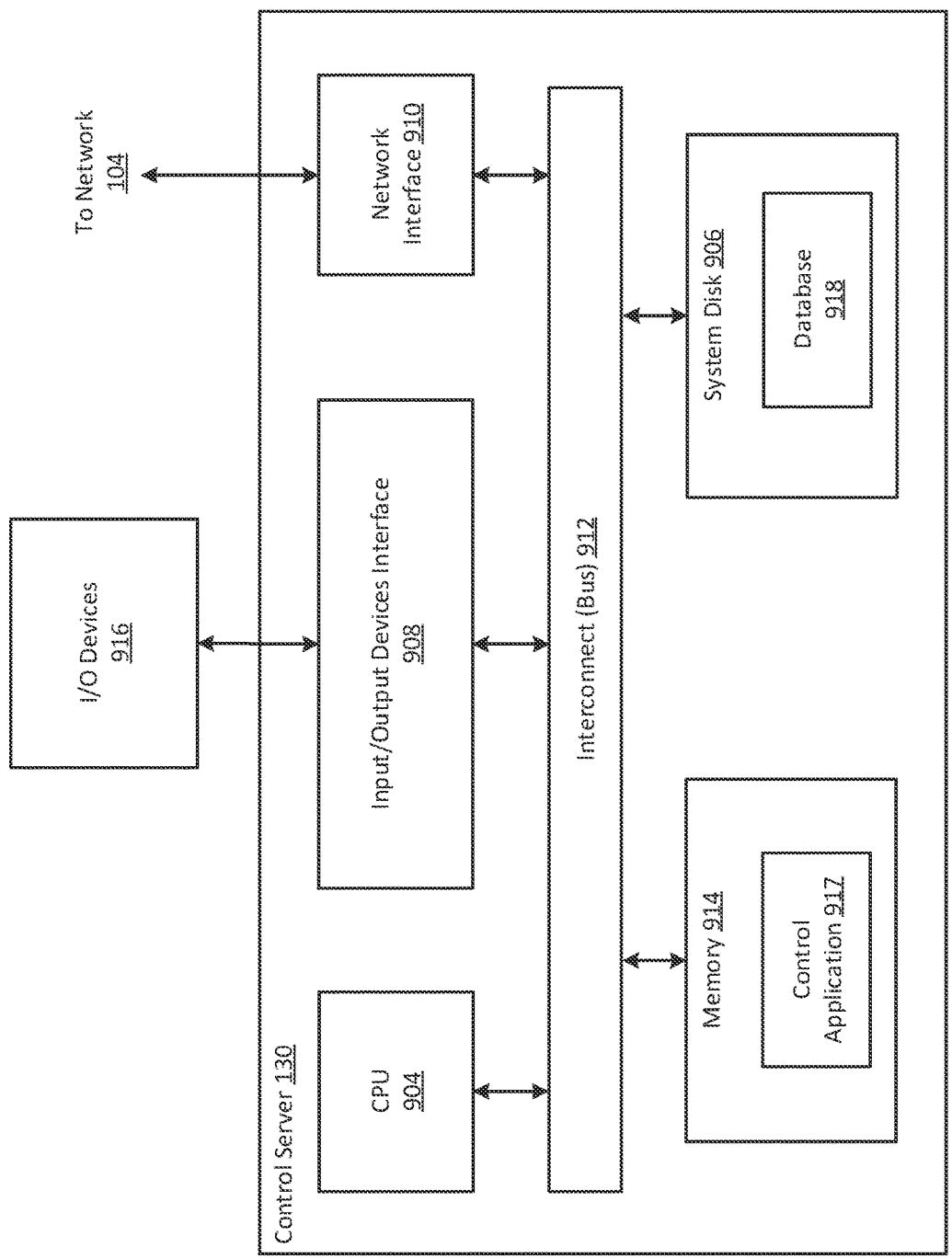
FIG. 9 is a more detailed illustration of the control server of FIG. 7, according to various embodiments of the present disclosure.

FIG. 9 is a more detailed illustration of control server 130 of FIG. 7, according to various embodiments of the present disclosure. As shown, the control server 130 includes, without limitation, CPU 904, system disk 906, I/O device interface 908, network interface 910, interconnect 912, and system memory 914.

The CPU 904 is configured to retrieve and execute programming instructions, such as the control application 917, stored in the system memory 914. Similarly, the CPU 904 is configured to store application data (e.g., software libraries) and retrieve application data from the system memory 914 and/or the database 918 that is stored in the system disk 906. The interconnect 912 is configured to facilitate transmission of data between the CPU 904, the system disk 906, the I/O device interface 908, the network interface 910, and the system memory 914. The I/O device interface 908 is configured to transmit input data and output data between the one or more I/O devices 916 and the CPU 904 via the interconnect 912. In various embodiments, the system disk 906 may include one or more hard disk drives, solid state storage devices, etc. In various embodiments, the system disk 806 (shown in FIG. 8) is configured to store the database 918 that stores information associated with one or more the content servers 710, the cloud services 730, and/or the files 818.

The system memory 914 includes the control application 917 configured to access information stored in the database 918 and process the information to determine the manner in which the specific files 818 will be replicated across the content servers 710 included in the network infrastructure 700. The control application 917 may further be configured to receive and analyze performance characteristics associated with the one or more content servers 710 and/or the endpoint devices 102.

Figure 10:
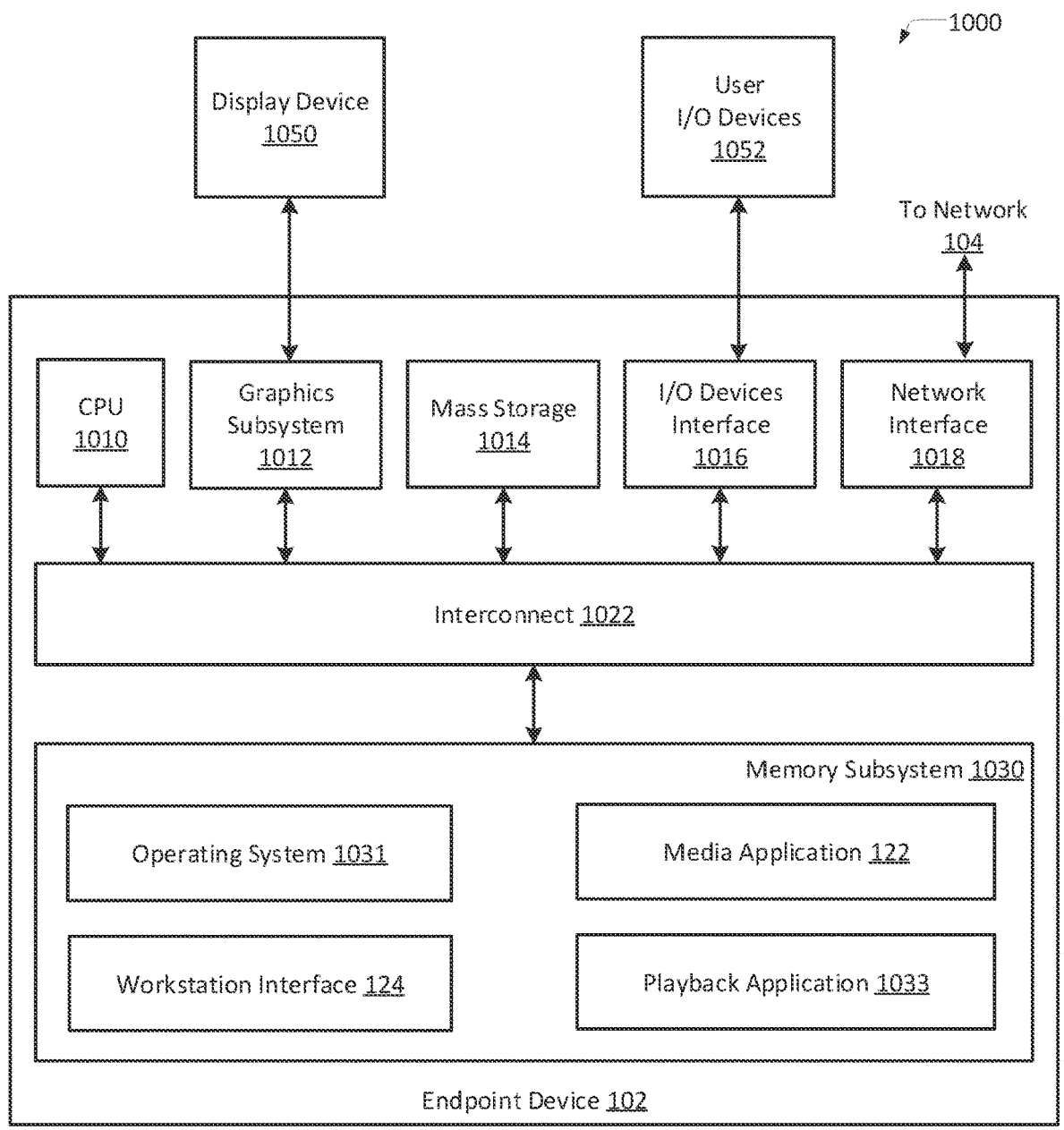
FIG. 10 is a more detailed illustration of the endpoint device of FIG. 7, according to various embodiments of the present disclosure.

FIG. 10 is a more detailed illustration of endpoint device 102 of FIG. 1, according to various embodiments of the present disclosure. As shown, the network infrastructure 1000 including the endpoint device 102 may include, without limitation, a CPU 1010, a graphics subsystem 1012, a mass storage unit 1014, an I/O device interface 1016, a network interface 1018, an interconnect 1022, a memory subsystem 1030, a display device 1050, and user I/O devices 1052.

The CPU 1010 is configured to retrieve and execute programming instructions stored in the memory subsystem 1030. Similarly, the CPU 1010 is configured to store and retrieve application data (e.g., software libraries) residing in the memory subsystem 1030. Additionally or alternatively, the CPU 1010 is configured to store and retrieve data, including content items and/or application data, from the mass storage unit 1014. The interconnect 1022 is configured to facilitate transmission of data, such as programming instructions and application data, between the CPU 1010, the graphics subsystem 1012, the mass storage unit 1014, the I/O devices interface 1016, the network interface 1018, and the memory subsystem 1030.

The graphics subsystem 1012 is configured to generate frames of video data and transmit the frames of video data to the display device 1050. In various embodiments, the graphics subsystem 1012 may be integrated, along with the CPU 1010, into an integrated circuit (IC). The display device 1050 may comprise any technically-feasible means for generating an image for display. For example, the display device 1050 could be fabricated using liquid crystal display (LCD) technology, cathode-ray tube technology, and/or light-emitting diode (LED) display technology. In various embodiments, the display device 1050 may display one or more graphical user interfaces (GUIs).

The mass storage unit 1014 can include, for example, a hard disk drive and/or flash-memory storage drive, and is configured to store nonvolatile data. For example, the mass storage unit 1014 could store one or more files 818, such as content items and/or application data. In various embodiments, the endpoint device 102 may copy the one or more files 818 stored in the memory subsystem 1030 (e.g., secure application data) to the mass storage unit 1014.

The input/output (I/O) device interface 1016 is configured to receive input data from the user one or more I/O devices 1052 and transmit the input data to the CPU 1010 via the interconnect 1022. For example, the user I/O device 1052 may comprise one of more buttons, a keyboard, and a mouse or other pointing device. In various embodiments, the I/O device interface 1016 also includes an audio output unit configured to generate an electrical audio output signal. In such instances, the user I/O device 1052 may include an audio output device, such as headphones and/or a loudspeaker, configured to generate an acoustic output in response to the electrical audio input signal. Additionally or alternatively, the display device 1050 may include the loudspeaker. Examples of suitable devices known in the art that can display video frames and generate an acoustic output include televisions, smartphones, smartwatches, electronic tablets, etc.

The network interface 1018 is configured to transmit and receive packets of data via the network 104. In some embodiments, the network interface 1018 is configured to communicate using at least one of the Ethernet standard, the Bluetooth standard, and/or one or more wireless communication standards. The network interface 1018 is coupled to the CPU 1010 via the interconnect 1022.

The memory subsystem 1030 includes various portions of memory, programming instructions, and/or application data. In various embodiments, the memory subsystem 1030 may include an operating system 1031, the workstation interface 124, the media application 122, and the playback application 1033.

The operating system 1031 performs system management functions, such as managing hardware devices including the graphics subsystem 1012, the mass storage unit 1014, the I/O device interface 1016, and the network interface 1018. The operating system 1031 also provides process and memory management models for the operating system 1031, the workstation interface 124, the media application 122, and the playback application 1033. For example, the endpoint device 102 may execute the operating system 1031 to write data to a cache and/or sync data included in the cache to the mass storage unit 1014.

In various embodiments, the operating system 1031 may provide a user interface (UI) that may be, for example, a graphical user interface (GUI) employing a window-and-object metaphor, provides a mechanism for user interaction with the endpoint device 102. Persons skilled in the art will recognize the various operating systems 1031 and/or user interfaces that are suitable for incorporation into the endpoint device 102. In various embodiments, the user interface may present various files in a file system, including one or more objects stored in the cloud services 730, object storage 160, and/or the data store 170 and mounted as one or more files. In some embodiments, the endpoint device 102 may execute a headless configuration that does not include a UI.

The playback application 1033 performs various playback functions associated with content items, such as displaying a GUI for content item selection and video playback of specific multimedia content items. The GUI employs a window-and-object metaphor to provide a mechanism for user interaction with the endpoint device 102. Persons skilled in the art will recognize various operating systems and/or user interfaces that are suitable for incorporation into the playback application 1033. The playback application 1033 is configured to request and/or receive content (e.g., one or more files 818) from the content server 710 via the network interface 1018. Further, the playback application 1033 is configured to interpret the content and present the content via the display device 1050 and/or the user I/O devices 1052.

In sum, a workstation pool manager receives multiple requests from endpoint devices requesting access to remote workstation instances. Each workstation request message that is transmitted from a given endpoint device includes a set of configuration settings with which a workstation instance is to operate. Such settings may include, for example, a specific operating system type, remote display protocol type, suite of installed applications, and other configuration settings and/or characteristics that specify how a workstation instance operates. The workstation pool manager maintains a list of existing workstation pools that are available in a connected workstation configuration server. Each workstation pool is associated with a specific set of configuration settings and includes multiple workstation instances that each have the same specific set of configuration settings. When the workstation pool manager determines that the set of configuration settings requested by the endpoint device match a set of configuration settings of an existing workstation pool, the workstation pool manager reports the identified workstation pool having the applicable set of configuration settings. The endpoint device then acquires a workstation instance from the identified workstation pool. Otherwise, when the workstation pool manager determines that the set of configuration settings requested by the endpoint device does not match any existing workstation pool, the workstation pool manager causes the workstation configuration server to generate a workstation pool that includes multiple workstation instances.

In various embodiments, the workstation pool manager may monitor the workstation configuration server to determine whether a given workstation pool includes a minimum quantity of available workstation instances. When the workstation pool manager determines that the quantity of available workstation instances is below the minimum quantity, the workstation pool manager causes the workstation configuration server to generate one or more workstation instances to reach the minimum quantity. Additionally or alternatively, the workstation pool manager may process historical data associated with the workstation pools, such as workstation logs, previous requests, and previous connections to workstation instances in order to anticipate demand for specific workstation instances. In such cases, the workstation pool manager may scale the size of given workstation pools by causing the workstation configuration server to generate, decommission, and/or scale specific workstation pools. Such scaling ensures that multiple workstation instances are available to be acquired by requesting endpoint devices without initially receiving a specific workstation request message.

At least one technological advantage of the disclosed techniques relative to the prior art is that the workstation pool manager efficiently controls the availability of workstation instances that endpoint devices access. In particular, by causing multiple workstation instances to be available for endpoint devices to access, endpoint devices no longer wait for workstation instances to be generated, significantly reducing delays associated with connecting to remote workstations and performing tasks. Further, by controlling the scaling of workstation pools within a given configuration server, the workstation pool manager efficiently uses limiting storage and processing resources by scaling up workstation instances associated with high-demand configurations, while causing the server to delete idle workstation instances. These technical advantages provide one or more technological advancements over prior art approaches.

1. In various embodiments, a computer-implemented method comprises receiving, from a client, a request for a workstation instance having a first configuration, in response to the request, generating a first workstation pool associated with the first configuration, where the first workstation pool includes at least two unassigned workstation instances having the first configuration, and assigning at least a first workstation instance included in the at least two unassigned workstation instances to the client.

2. The computer-implemented method of clause 1, where the first workstation pool includes a set of one or more additional workstation instances having the first configuration.

3. The computer-implemented method of clause 1 or 2, further comprising determining that a second workstation instance included in the at least two unassigned workstation instances has been idle over a threshold time period, and terminating the second workstation instance.

4. The computer-implemented method of any of clauses 1-3, further comprising determining, upon the second workstation instance being terminated, that one or zero workstation instances remain in the first workstation pool, and removing a pool identifier for the first workstation pool from a list of existing workstation pools, where the first workstation pool is unavailable once the pool identifier is removed from the list of existing workstation pools.

5. The computer-implemented method of any of clauses 1-4, further comprising determining that the first workstation pool has fewer than two unassigned workstation instances; and adding one or more workstation instances having the first configuration to the first workstation pool until the first workstation pool includes at least two unassigned workstation instances having the first configuration.

6. The computer-implemented method of any of clauses 1-5, further comprising adding the first workstation pool to a list of available workstation pools, and reporting the first workstation pool to the client that transmitted the request.

7. The computer-implemented method of any of clauses 1-6, further comprising receiving a manifest associated with a given user of the client, where the manifest identifies one or more content items that are accessible by the given user, and for each of the one or more content items, a data store that stores data associated with the content item, and generating, for each of the one or more content items, a reference that enables the first workstation instance to access the content item.

8. The computer-implemented method of any of clauses 1-7, where a set of applications specified in the first configuration are installed in the first workstation instance after the client has been authenticated.

9. The computer-implemented method of any of clauses 1-8, where the first configuration includes a set of characteristics that specify at least one of an operating system type, a remote display protocol type, presence of a graphical processing unit, or a set of applications installed on a given workstation instance.

10. The computer-implemented method of any of clauses 1-9, further comprising generating, based on the first configuration, a pool identifier for the first workstation pool, wherein portions of the pool identifier includes at least one of the set of characteristics.

11. The computer-implemented method of any of clauses 1-10, where the request specifies a first region in a plurality of regions, and further comprising determining whether the first workstation pool is available in the first region.

12. The computer-implemented method of any of clauses 1-11, further comprising scheduling the creation of the first workstation pool by retrieving a set of workstation metrics associated with the first configuration, and determining, based on the set of workstation metrics, a scheduled start time that the first workstation pool to be created.

13. The computer-implemented method of any of clauses 1-12, where the client transmits, to a second client, a message containing the first configuration, and the second client transmits a second request for a second workstation instance having the first configuration.

14. The computer-implemented method of any of clauses 1-13, further comprising generating a queue request that includes the first configuration, the first workstation pool is created based on a queue that includes the queue request.

15. The computer-implemented method of any of clauses 1-14, further comprising determining that a workstation pool that is associated with the first configuration is unavailable.

16. In various embodiments, one or more non-transitory computer-readable media storing instructions that, when executed by one or more processors, cause the one or more processors to perform the steps of receiving, from a client, a request for a workstation instance having a first configuration, in response to the request, generating a first workstation pool associated with the first configuration, wherein the first workstation pool includes at least two unassigned workstation instances having the first configuration, and assigning at least a first workstation instance included in the at least two unassigned workstation instances to the client.

17. The one or more non-transitory computer-readable media of clause 16, where the first workstation pool includes a set of one or more additional workstation instances having the first configuration.

18. The one or more non-transitory computer-readable media of claim 16, further comprising instructions that, when executed by the one or more processors, cause the one or more processors to perform the steps of determining that the first workstation pool has fewer than two unassigned workstation instances, and adding one or more workstation instances having the first configuration to the first workstation pool until the first workstation pool includes at least two unassigned workstation instances having the first configuration.

19. In various embodiments, a system comprises a memory storing a workstation pool management application, and a processor coupled to the memory that executes the workstation pool manager application by performing the steps of receiving, from a client, a request for a workstation instance having a first configuration, in response to the request, generating a first workstation pool associated with the first configuration, wherein the first workstation pool includes at least two unassigned workstation instances having the first configuration, and assigning at least a first workstation instance included in the at least two unassigned workstation instances to the client.

20. The system of clause 19, where the processor further executes the workstation pool manager application by performing the step of adding, in addition to the at least two unassigned workstation instances, a set of one or more additional workstation instances having the first configuration.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method comprising:
receiving, from a client, a request for a workstation instance having a first configuration;
in response to the request, generating a first workstation pool associated with the first configuration, wherein the first workstation pool includes at least two unassigned workstation instances having the first configuration;
assigning at least a first workstation instance included in the at least two unassigned workstation instances to the client;
receiving a manifest that includes security information associated with a user of the client and identifies one or more content items that are accessible by the user; and
retrieving, from a data store, the one or more content items using the security information.

2. The computer-implemented method of claim 1, wherein the first workstation pool includes a set of one or more additional workstation instances having the first configuration.

3. The computer-implemented method of claim 1, further comprising:
determining that a second workstation instance included in the at least two unassigned workstation instances has been idle over a threshold time period; and
terminating the second workstation instance.

4. The computer-implemented method of claim 3, further comprising:
determining, upon the second workstation instance being terminated, that one or zero workstation instances remain in the first workstation pool; and
removing a pool identifier for the first workstation pool from a list of existing workstation pools, wherein the first workstation pool is unavailable once the pool identifier is removed from the list of existing workstation pools.

5. The computer-implemented method of claim 1, further comprising:
determining that the first workstation pool has fewer than two unassigned workstation instances; and
adding one or more workstation instances having the first configuration to the first workstation pool until the first workstation pool includes at least two unassigned workstation instances having the first configuration.

6. The computer-implemented method of claim 1, further comprising:
adding the first workstation pool to a list of available workstation pools; and
reporting the first workstation pool to the client that transmitted the request.

7. The computer-implemented method of claim 1, wherein the manifest identifies the data store that is storing the one or more content items, further comprising generating, for at least a first content item of the one or more content items, a reference that enables the first workstation instance to access the first content item.

8. The computer-implemented method of claim 1, wherein a set of applications specified in the first configuration are installed in the first workstation instance after the client has been authenticated.

9. The computer-implemented method of claim 1, wherein the first configuration includes a set of characteristics that specify at least one of an operating system type, a remote display protocol type, presence of a graphical processing unit, or a set of applications installed on a given workstation instance.

10. The computer-implemented method of claim 9, further comprising generating, based on the first configuration, a pool identifier for the first workstation pool, wherein portions of the pool identifier includes at least one of the set of characteristics.

11. The computer-implemented method of claim 1, wherein the request specifies a first region in a plurality of regions, and further comprising determining whether the first workstation pool is available in the first region.

12. The computer-implemented method of claim 1, wherein:
the client transmits, to a second client, a message containing the first configuration; and
upon assignment of the first configuration to the client, the second client transmits a second request for the workstation instance having the first configuration; and a second workstation instance included in the at least two unassigned workstation instances is assigned to the second client.

13. The computer-implemented method of claim 1, further comprising generating a queue request that includes the first configuration, the first workstation pool is created based on a queue that includes the queue request.

14. The computer-implemented method of claim 1, further comprising determining that a workstation pool that is associated with the first configuration is unavailable.

15. One or more non-transitory computer-readable media storing instructions that, when executed by one or more processors, cause the one or more processors to perform the steps of:
receiving, from a client, a request for a workstation instance having a first configuration;
in response to the request, generating a first workstation pool associated with the first configuration, wherein the first workstation pool includes at least two unassigned workstation instances having the first configuration; and
assigning at least a first workstation instance included in the at least two unassigned workstation instances to the client;
receiving a manifest that includes security information associated with a user of the client and identifies one or more content items that are accessible by the user; and
retrieving, from a data store, the one or more content items using the security information.

16. The one or more non-transitory computer-readable media of claim 15, wherein the first workstation pool includes a set of one or more additional unassigned workstation instances having the first configuration.

17. The one or more non-transitory computer-readable media of claim 15, further comprising instructions that, when executed by the one or more processors, cause the one or more processors to perform the steps of:
determining that the first workstation pool has fewer than two unassigned workstation instances; and
adding one or more workstation instances having the first configuration to the first workstation pool until the first workstation pool includes at least two unassigned workstation instances having the first configuration.

18. A system comprising:
a memory storing a workstation pool manager application; and
a processor coupled to the memory that executes the workstation pool manager application by performing the steps of:
receiving, from a client, a request for a workstation instance having a first configuration;
in response to the request, generating a first workstation pool associated with the first configuration, wherein the first workstation pool includes at least two unassigned workstation instances having the first configuration;
assigning at least a first workstation instance included in the at least two unassigned workstation instances to the client;
receiving a manifest that includes security information associated with a user of the client and identifies one or more content items that are accessible by the user; and
retrieving, from a data store, the one or more content items using the security information.

19. The system of claim 18, wherein the processor further executes the workstation pool manager application by performing the step of adding, in addition to the at least two unassigned workstation instances, a set of one or more additional workstation instances having the first configuration.

* * * * *